(12) United States Patent
Perper et al.

(10) Patent No.: US 8,575,785 B2
(45) Date of Patent: *Nov. 5, 2013

(54) ENERGY CONSERVING (STAND-BY MODE) POWER SAVING DESIGN FOR BATTERY CHARGERS AND POWER SUPPLIES WITH A CONTROL SIGNAL

(75) Inventors: Harry Leonard Perper, North Potomac, MD (US); James Randall Beckers, Rockville, MD (US)

(73) Assignee: Glithouby Mgmt. LLC, Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/527,946

(22) Filed: Jun. 20, 2012

(65) Prior Publication Data

US 2012/0256489 A1 Oct. 11, 2012

Related U.S. Application Data

(63) Continuation of application No. 12/913,238, filed on Oct. 27, 2010, now Pat. No. 8,232,685, which is a continuation-in-part of application No. 12/195,813, filed on Aug. 21, 2008, now Pat. No. 7,843,088.

(60) Provisional application No. 61/034,782, filed on Mar. 7, 2008.

(51) Int. Cl.
*H01H 9/54* (2006.01)

(52) U.S. Cl.
USPC .......................................... 307/140

(58) Field of Classification Search
USPC .......................................... 307/140
See application file for complete search history.

(56) References Cited

U.S. PATENT DOCUMENTS

| | | | |
|---|---|---|---|
| 4,237,385 A | 12/1980 | Jurgens et al. | |
| 5,565,714 A | 10/1996 | Cunningham | |
| 5,579,524 A | 11/1996 | Kikinis | |
| 6,330,175 B2 | 12/2001 | Shirato et al. | |
| 6,865,094 B2 | 3/2005 | Malik et al. | |
| 7,643,950 B1 | 1/2010 | Getzin et al. | |
| 7,843,088 B2 * | 11/2010 | Perper et al. | 307/140 |
| 2008/0148082 A1 * | 6/2008 | Shen et al. | 713/320 |
| 2008/0195874 A1 | 8/2008 | Zhou | |
| 2009/0206792 A1 | 8/2009 | Hyatt | |
| 2010/0052615 A1 | 3/2010 | Loncarevic | |

OTHER PUBLICATIONS

PCT/US2007/074968 Johnson,Don,R.*

(Continued)

*Primary Examiner* — Robert L. Deberadinis
(74) *Attorney, Agent, or Firm* — Stolowitz Ford Cowger LLP

(57) ABSTRACT

A system is described that turns off a high power, power supply when a device no longer needs high power. A low power, power supply or a rechargeable battery provides power to determine when the device again needs high power. The low power supply consumes a minimum possible power when the device does not need high power and the power rechargeable battery is not charged. That is, the high power and low power, power supplies are turned on or off based on the real time power consumption need of the device and the charged state of the battery. The power need of the device is monitored by a current shunt monitoring circuit and a control signal monitoring circuit.

26 Claims, 11 Drawing Sheets

(56) References Cited

OTHER PUBLICATIONS

"H.R. 6: Energy Independence and Security Action of 2007", GovTrack, from URL: http://www.govtrack.us/congress/bill.xpd?bill=h110-6&tab=summary, Retrieved from Internet on Sep. 4, 2008.

"The Current and Projected Future Market for Battery Chargers and External Power Supplies", U.S. Department of Energy, Office of Energy Efficiency and Renewable Energy, Building Technologies Program, Dec. 2006.

"Plans for Developing Energy Conservation Standards for Battery Chargers and External Power Supplies", U.S. Department of Energy, Office of Energy Efficiency and Renewable Energy, Building Technologies Program, Dec. 2006.

Thomas Kugelstadt, "Low-cost current-shunt monitor IC revives moving-coil meter design", Analog Applications Journal, Texas Instruments Incorporated, 2Q 2006, pp. 27-30.

"Voltage Output High-Side Measurement Current Shunt Monitor", Texas Instruments, from URL: http://focus.ti.com/docs/prod/folders/print/ina193.html, Retrieved on Dec. 27, 2007.

"AD8212: High Voltage Current Shunt Monitor", Analog Devices, from URL: http://www.analog.com/en/amplifiers-and-comparators/current-sense-amplifiers/AD8212/products/product.html, Retrieved on Sep. 4, 2008.

"Single-Supply Sensor Interface Amplifier", Analog Devices, AD22057, 1999.

"High Voltage, Bidirectional Current Shunt Monitor", Analog Devices, AD8210, 2006-2007.

"High Voltage Current Shunt Monitor", Analog Devices, AD8212, 2007.

"NEW Series SH, Output to 125A, 690 Vac, High Industrial Performance (HIPpak) Solid-State Relays", Teledyne Relays, 2005.

"Power PCB Relay G6C", OMRON.

Office Action issued May 17, 2010 in corresponding U.S. Appl. No. 12/195,813.

Notice of Allowance issued Jul. 23, 2010 in corresponding U.S. Appl. No. 12/195,813.

"Bits Limited—Going Green Made Easy. Home of the Smart Strip," Bits Limited, from URL: http://catalog.bitsltd.us/catalog/SMART/SCK.html, Retrieved on Mar. 29, 2011.

"Plug Load—Isole IDP-3050 Power Strip with Personal Sensor," WattStopper, from URL: http://www.wattstopper.com/products/detailes.html?id=74, Retrieved on Mar. 29, 2011.

Stolowitz Ford Cowger LLP, "Listing of Related Cases", Jun. 20, 2012, 1 page.

\* cited by examiner

Embodiment 2

High Level Operating Flowchart

Embodiment 4

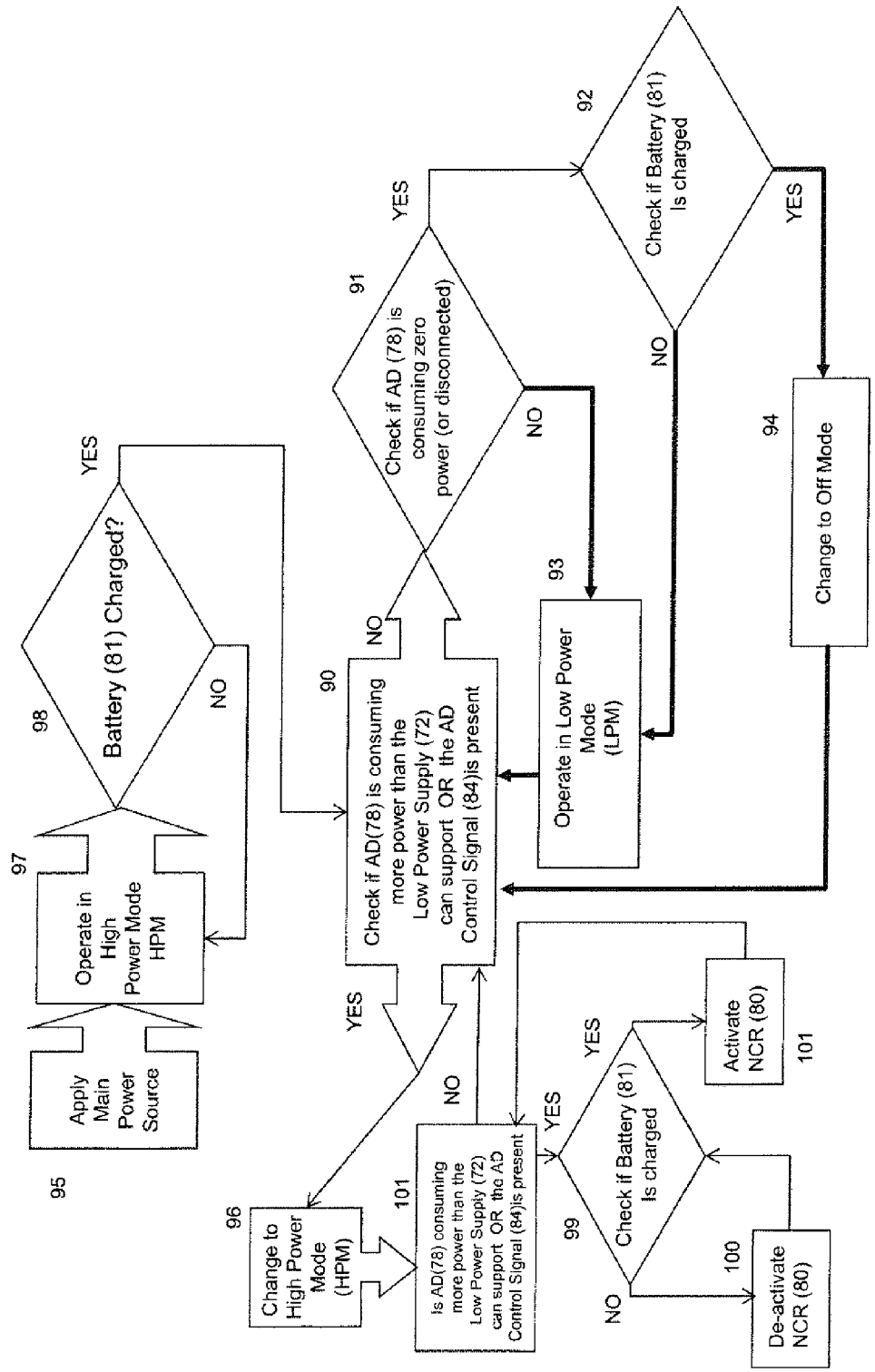

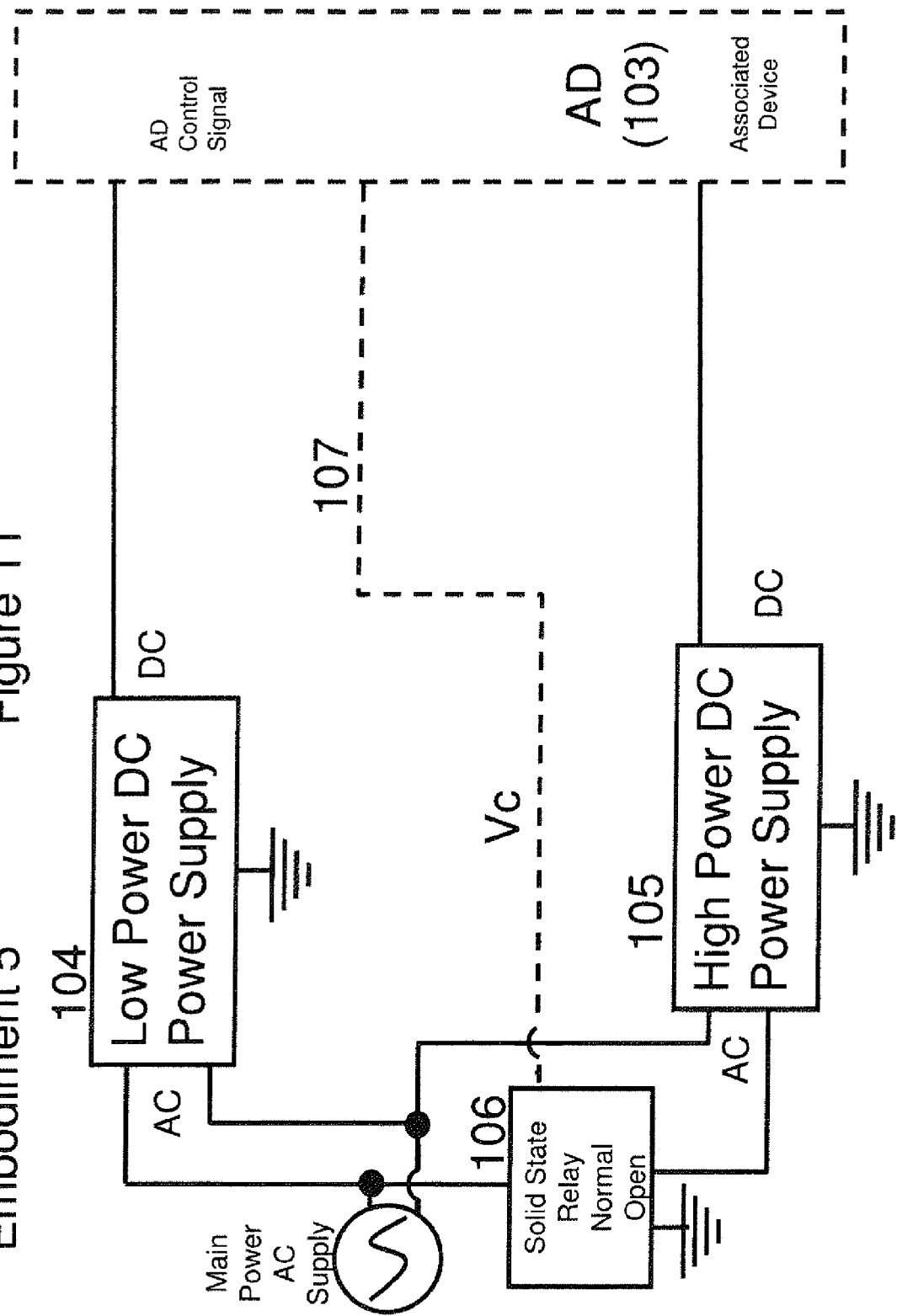

ENERGY CONSERVING (STAND-BY MODE) POWER SAVING DESIGN FOR BATTERY CHARGERS AND POWER SUPPLIES WITH A CONTROL SIGNAL

CROSS-REFERENCE TO RELATED APPLICATION

This application is a continuation of U.S. patent application Ser. No. 12/913,238, filed Oct. 27, 2010, now U.S. Pat. No. 8,232,685, issued Jul. 31, 2012, which is a continuation-in-part of U.S. patent application Ser. No. 12/195,813, filed Aug. 21, 2008, now U.S. Pat. No. 7,843,088, issued Nov. 30, 2010, and is related to and claims priority to U.S. Provisional Patent Application No. 61/034,782, filed Mar. 7, 2008, the specifications of which are herein incorporated by reference in their entirety.

BACKGROUND

1. Field

The embodiments discussed herein are directed to electronic systems, and more specifically to the power supplies in electronic systems.

2. Description of the Related Art

The electronics industry has developed power supply (PS) and battery charger (BC) systems to power associated devices (AD) including portable DVD players, laptops, video games and televisions to home appliances. Many of these devices have an in-use or full power cycle ratio 1% to 50%. The power cycle indicates the percentage of time that the AD requires the full power potential of the power supply. These devices typically operate in two modes, low and high, power consumption. The devices operate in high power mode when on, active or charging a battery. They operate in low power mode when off or in standby mode.

The power supplies for these devices are designed to provide enough power to supply the maximum power consumption needs (high power mode) of the AD via a single output. The PS/BC is typically connected to the main alternating current (AC) power source (plugged in) 100% of the time. Therefore the power supply or battery charger (these terms are used interchangeably throughout this document) is active and consuming AC power when the AD is turned off, in standby mode, sleep mode or physically disconnected, in other words "downtime". Power consumption during "downtime" is also called phantom and vampire power use. This embodiment reduces the AC power consumption of the PS/BC, based on conventional technology, by up to 100% during downtime. The embodiment disclosed herein provides an upgrade path for manufacturers to meet or exceed the evolving Environmental Protection Agency (EPA)/Department of Energy, Energy Star program qualifications. The electronic industry as well as society is very interested in improving the power savings of these devices.

SUMMARY

It is an aspect of the embodiments discussed herein to provide an improved power supply.

The above aspects can be attained by a system that provides a power supply system including multiple, typically two power supplies, low power and high power and a control signal from the associated device (AD). The low power supply is designed to consume the minimum possible power when the AD, is in standby mode. The high power supply is designed to supply the maximum power consumption requirement of the AD. The high power and low power supplies are turned on or off based on the real time power consumption of the AD. The power consumption of the AD is monitored by a current shunt monitoring circuit (CSMC).

In the following detailed descriptions, reference is made to the accompanying drawings that show, by way of illustration, specific embodiments. These embodiments are described in sufficient detail to enable those skilled in the art to make and use the embodiments. It is to be understood that the various embodiments, although different, are not necessarily mutually exclusive. For example, a particular feature, structure, or characteristic described herein in connection with one embodiment may be implemented within other embodiments without departing from the spirit and scope of the disclosure. In addition, it is to be understood that the location or arrangement of individual elements within each disclosed embodiment may be modified without departing from the spirit and scope of the disclosure. The following detailed descriptions are, therefore, not to be taken in a limiting sense, and the scope of the embodiments is defined only by the appended claims, appropriately interpreted, along with the full range of equivalents to which the claims are entitled. In the drawings, like numerals refer to the same or similar functionality throughout the several views.

These together with other aspects and advantages which will be subsequently apparent, reside in the details of construction and operation as more fully hereinafter described and claimed, reference being had to the accompanying drawings forming a part hereof, wherein like numerals refer to like parts throughout.

It is an aspect of the embodiments discussed herein to provide an improved power supply.

BRIEF DESCRIPTION OF THE DRAWINGS

FIG. 10 shows a High Level Flow Chart of the Operational Logic of the embodiment number 4.

FIG. 11 shows a power supply in accordance with the embodiment 5.

DETAILED DESCRIPTION OF THE EMBODIMENTS

This system is described in five embodiments to illustrate five of the possible implementations.

First Embodiment

Figure 1:
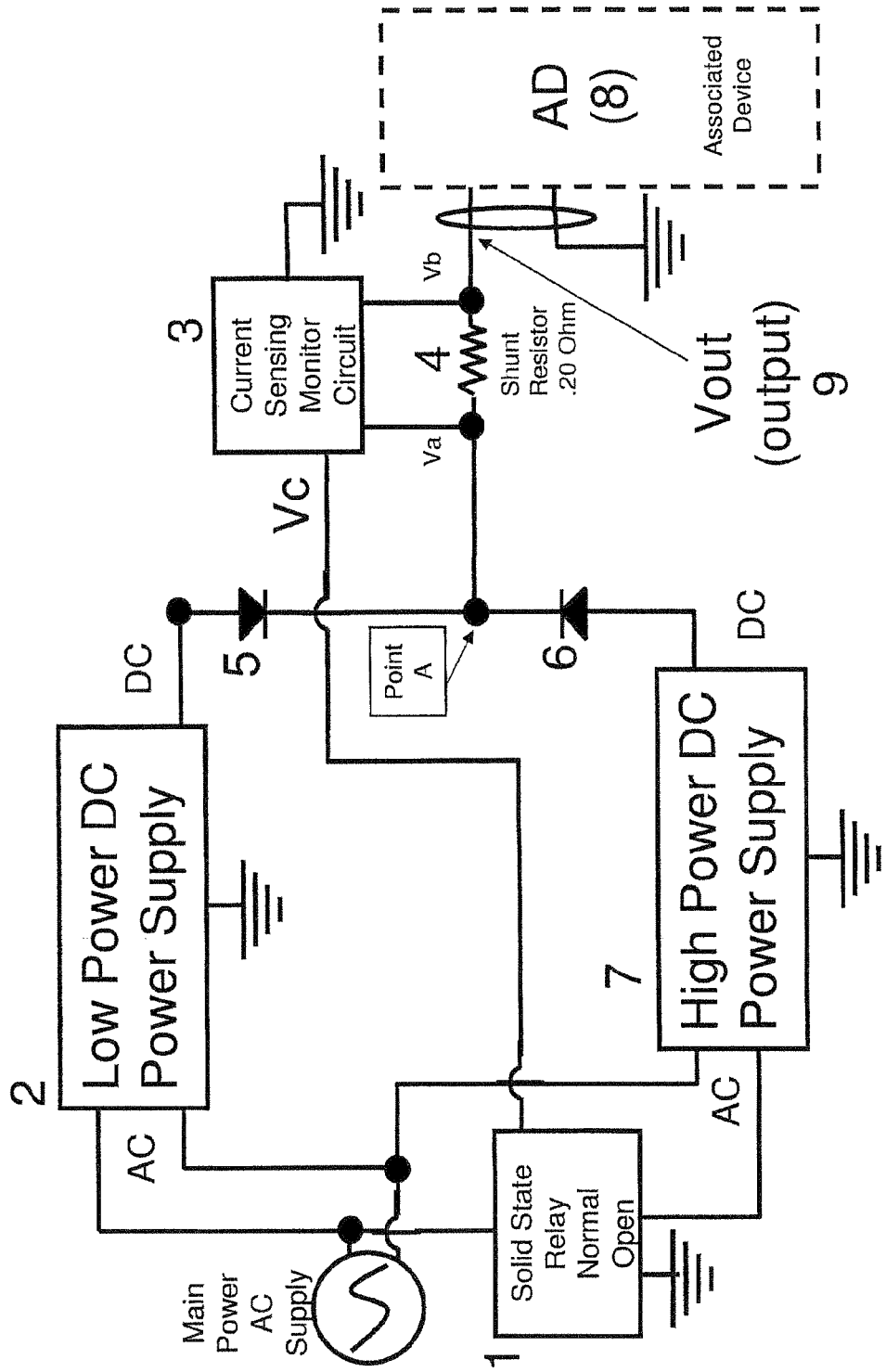
FIG. 1 shows a power supply in accordance with the embodiment number 1.
Figure 2:
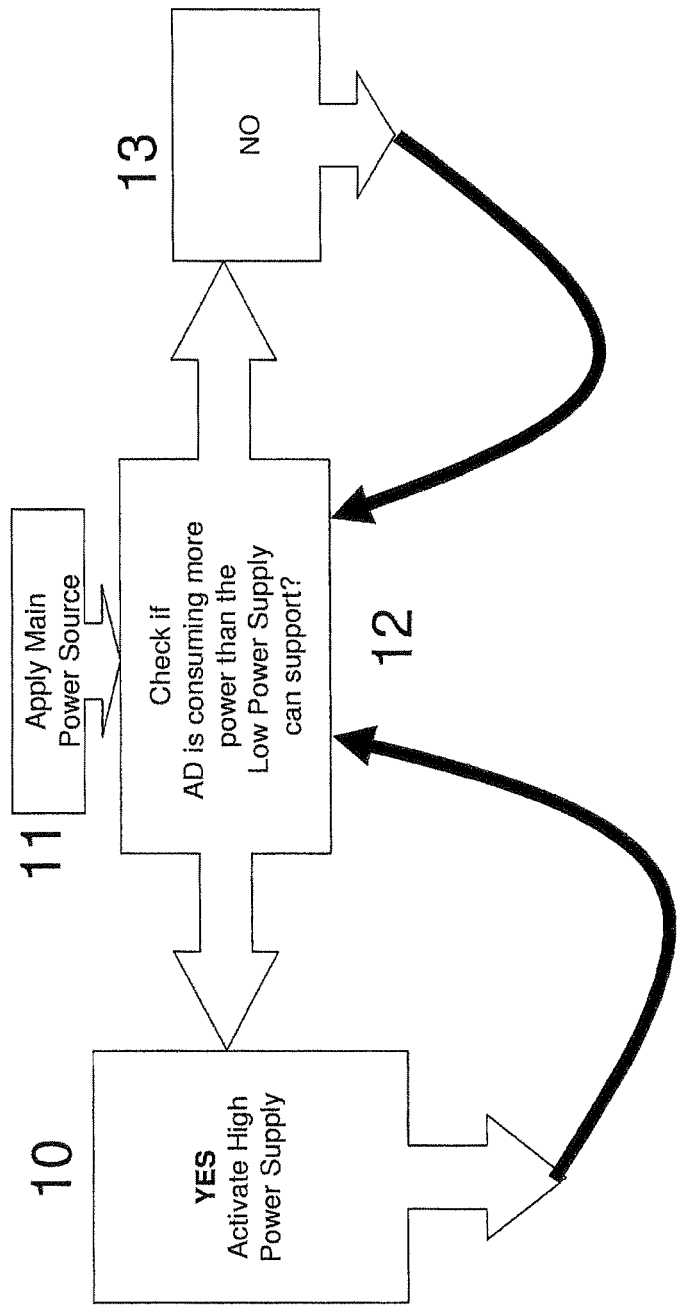
FIG. 2 shows a High Level Flow Chart of the Operational Logic of the embodiment number 1.
Figure 3:
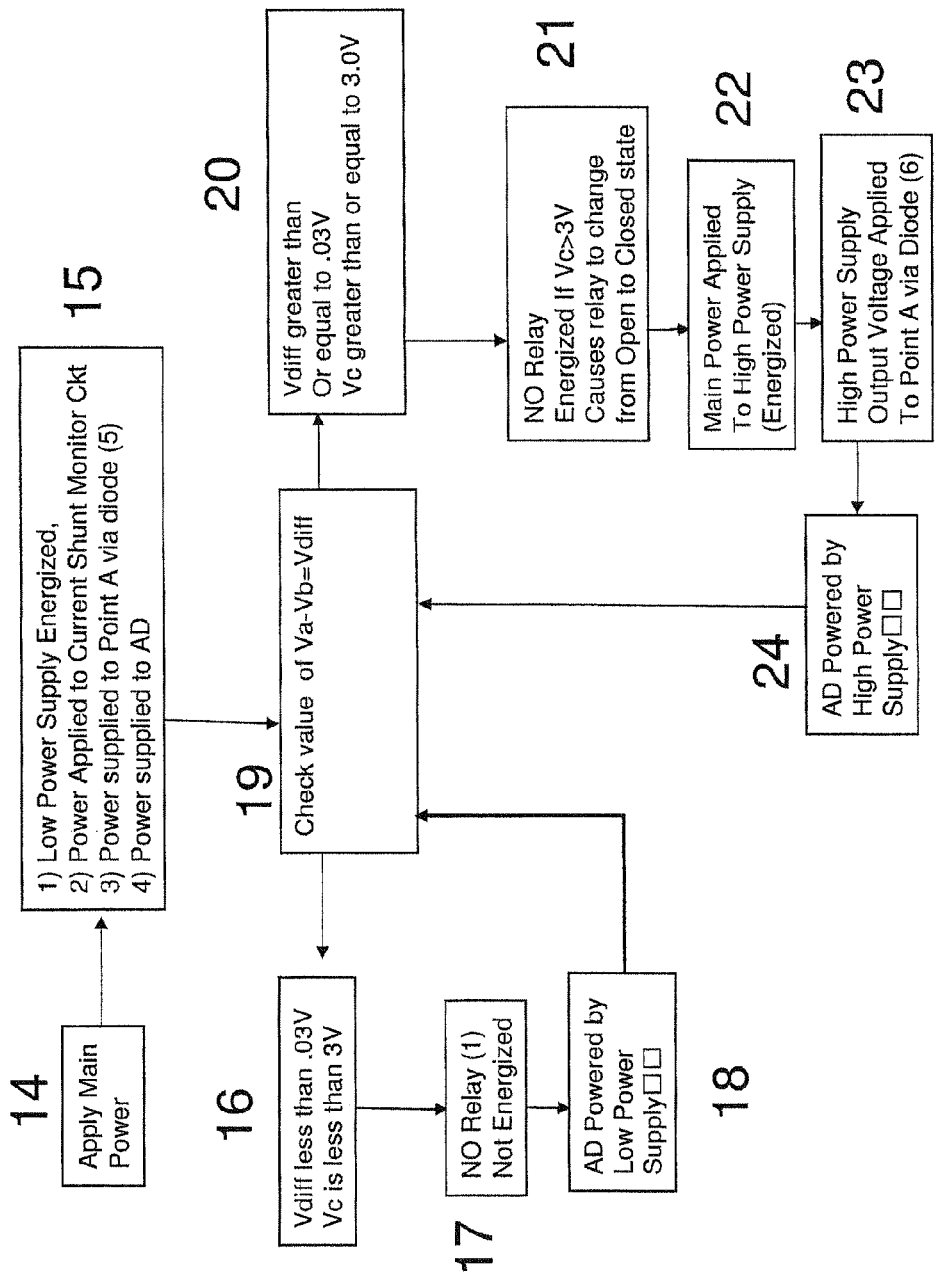
FIG. 3 shows a Detailed Level Flow Chart of the Operational Logic of the embodiment number 1.

The following embodiment, as depicted in FIG. 1, is of a power supply and/or battery charger (PS/BC) system used to power associated devices (8) (AD (8)) with power consumption characteristics that include low power consumption (50% to 99% of the time) and high power consumption (1%-50% of the time). The first embodiment operating flow charts are depicted in FIGS. 2 and 3. This embodiment is a design to power a rechargeable laptop computer. The exact ratio of time the AD (8) requires high power versus low power is not critical.

The embodiment discussed herein includes a power supply or battery charger (PS/BC) designed to minimize the power consumption of itself during the times the AD (8) is disconnected, in stand-by, sleep mode or off. FIG. 1 shows a power supply or battery charger (PS/BC) in accordance with this embodiment.

The embodiment switches between a low power mode (LPM) and high power mode (NPM) depending on the real time power consumption requirements of the AD (8). The logical determination is identified in FIGS. 2 and 3 as (12) and (19). The power consumption of the AD (8) varies based on the following conditions: stand-by or sleep (reduced power consumption) mode, turned off, battery charging mode, disconnected or normal active mode (on). The following is a description of the embodiment of a laptop power supply. In the description the AD represents a laptop computer.

This embodiment comprises a high power supply (7) Manufacturer: Dell Model Number: ADP-70EB and a low power supply (2) Manufacturer: CUI Inc., Model Number: ESPS240025-P5P, a normally open solid state power relay (NOR) (1) Teledyne Model Number: SH25D25, a current shunt monitor circuit (CSMC) (3) Analog Devices Model Number: AD8212, a (0.2 Ohm) shunt resistor (4), two diodes (5,6) and a single output (9) Vout. The CSMC (3) controls the state of the NOR (1). The state of the NOR (1) activates or deactivates the high power supply (7). The outputs of the low power supply (2) and the high power supply (7) are connected to each other with two diodes (5,6) in opposing directions at point A. The anode of each diode is connected to its associated power supply and the cathodes of each of the diodes (5,6) are connected at point A. The shunt resistor (4) is connected in series between the diodes (5,6) at point A and the AD (8) via the single output (9). The CSMC (3) monitors the difference in voltage across the shunt resistor (4). The CSMC (3) is connected in parallel to the shunt resistor (4). The high side input of the CSMC (3) is connected to the circuit between point A and the shunt resistor (4). The low side input of the CSMC (3) is connected to the circuit between the shunt resistor (4) and the output of the power supply (9). The output of the CSMC (3), control signal Vc, is equal to approximately 1000 times the difference in voltage across the shunt resistor (4), Vdiff. The output of the CSMC (3) controls the operation of the NOR (1), Vc.

The embodiment initially operates in low power mode (LPM) when the embodiment is plugged into or attached to the main AC power source (11, 12, 14, 15). The low power supply (2) is active whenever the embodiment is connected or attached to the main AC power source (100% of the time the embodiment is active). In the LPM mode the AD (8) and the CSMC (3) are powered by the low power supply (2). The embodiment operates in LPM whenever the AD (8) is in stand-by or sleep mode, off or disconnected from the embodiment or whenever the AD (8) requires less than or equal to 200 mW. In the LPM mode the high power supply (7) is inactive because it is disconnected from the main AC power source by the NOR (1) in the open state. The power mode is determined (12, 19) by the real time power consumption of the AD (8). The CSMC (3) monitors the power consumption of the AD (8) by monitoring the current through the shunt resistor (4).

The CSMC (3) monitors the output current level by measuring the difference in voltage, Vdiff, between the two sides (high and low side) of the shunt resistor (4), Vdiff=Va−Vb (19). The value of the shunt resistor (4) is determined by the maximum power capability of the low power supply (2), in this embodiment the value of the shunt resistor (4) is 0.2 ohms. The value of the shunt resistor (4) is determined to be such that the voltage drop, Vdiff, across the resistor (4) is approximately 0.0030 volts when the power consumed by the AD (8) equals 80% of the maximum power capability of the low power supply (2). In this embodiment the maximum power capability of the low power supply (2) is 250 mW. In this embodiment the CSMC (3) chosen provides a gain of approximately 1000 times the input voltage, Vdiff. In this embodiment the CSMC (3) used is an Analog Devices integrated circuit, part number AD8212. The output voltage of the CSMC (3) (Vc) will be approximately 1000 times the input voltage, Vdiff. Therefore when the power consumption of the AD (8) is zero watts the output of the CSMC, Vc, will be approximately zero volts. Hence when the power consumption of the AD (8) is 200 mW, 80% of the power capability of the low power supply (2), the output of the CSMC (3) (Vc) will be approximately 3.0V. The output of the CSMC (3), Vc, is a direct reflection of the real time power consumption of the AD (8) as function of the current flow through the shunt resistor (4) to the AD (8).

The output voltage of the CSMC (3) (Vc) is connected to the control input of the NOR (1). In this embodiment the NOR (1) is a solid-state relay with optical isolation, manufactured by Teledyne, model SH24D25. The NOR (1) is a normally open (NO) relay. When Vc is 2.9V or less the NOR (1) is in the open (circuit) mode. When the NOR (1) is in open mode the main AC power source is disconnected from the high power supply (7), deactivated. In this mode (low power mode, LPM) the low power supply (2) is supplying power to the CSMC (3) and the AD (8). When Vc is at or above 3.0V the NOR (1) is in closed (circuit) mode. When the NOR (1) is in closed mode the main AC power source (AC power) is connected to the input of the high power supply (7), via the NOR (1), which is closed/energized. In this mode, high power mode (HPM), the high power supply (7) is supplying power to the AD (8), via diode (6) and the shunt resistor (4).

The low power supply (2) and the high power supply (7) are connected to the shunt resistor (4) at point A via diodes (5,6). The diodes (5,6) protect the power supplies from reverse current damage.

Therefore this embodiment operates as follows:

1) When this embodiment (see FIG. 3) is attached to the main power source (11, 14, 15) the invention operates in LPM low power mode. The low power supply (2) is energized 100% of the time the embodiment is active. The low power supply (2) also supplies power to the AD (8) when the embodiment is in LPM mode.

2) The real time power consumption of the AD (8) is monitored by the CSMC (3) via Vdiff. If the power consumption causes Vdiff to exceed 0.0030V the current sensor output Vc, exceeds 3.0V. Vdiff equal to 0.0030V is called the Low Power Threshold.

3) If Vc is equal to or greater than 3.0V, the NOR (1) is energized, connecting the main AC power source to the high power supply (7). Refer to FIGS. 2 and 3 (12, 13, 19, 20, 21, 22, 23, 24).

4) When the NOR (1) is energized the main AC power source energizes the high power supply (7). When the high power supply (7) is energized it supplies power to the AD (8) via diode (6) and the shunt resistor (4) and Vout (9).

5) If the AD (8) reduces its power consumption such that Vdiff goes below 0.0030V, the output of the current sensor (3), Vc, goes below 3.0V. When Vc goes below 3.0V, the power NOR (1) is de-energized disconnecting the main AC power source from the high power supply (7). When the high power supply (7) is de-energized the low power supply (2) provides power to the current sensor and the AD (8) via the shunt (4) and Vout (9). Refer to FIGS. 2 and 3 (10μ, 12, 19, 16, 17, 18).

If the AD (8) is consuming more than 200 mW, then the embodiment is operating in HPM. The high power supply (7) provides power to the AD (8) via diode (6) and the shunt resistor (4). In HPM mode Vdiff is greater than or equal to 0.0030V (12, 13, 19, 16, 17, 18). In this mode the CSMC (3) continues to monitor Vdiff. If the real time power consumed by the AD (8) is reduced below the LPM threshold, Vdiff becomes less than 0.0030V. This can occur if the AD (8) is disconnected from the embodiment or the AD (8) changes to a stand-by or low power consumption mode. When this occurs the output of the CSMC (3), Vc, drops below 3.0V. When Vc is less than 3.0V the NOR (1) is de-energized. When the NOR (1) is de-energized the main AC power source is disconnected from the high power supply (7) and the output voltage of the high power supply (7) becomes zero. Once the main AC power source is disconnected from the high power supply (7) the embodiment is in low power mode (LPM). In LPM the low power supply (2) provides power to the AD (8) via diode (5) and shunt resistor (4) and provides power to operate the CSMC (3).

If the AD (8) is disconnected from the embodiment while the embodiment is in HPM mode, the embodiment changes to LPM. When the AD (8) is disconnected from the embodiment no current flows through the shunt resistor (4), When Vdiff is zero, Vc will be zero, which causes the NOR (1) to be de-energized. When the NOR (1) is de-energized the high power supply (7) is disconnected from the main AC power source. When the main AC power source is disconnected from the high power supply (7) the embodiment is in LPM.

If the embodiment is unplugged or disconnected from the main AC power source the embodiment will default to LPM when re-connected to the main AC power source (11, 12, 13, 14, 15, 19). If the AD (8) requires the embodiment to be in HPM when the embodiment is connected to the main AC power source the embodiment initially operates in LPM briefly until the CSMC (3) determines (12, 19) Vdiff is equal to or greater than 0.003V. Once Vdiff is greater than or equal to 0.003V the output of the CSMC (3) Vc, is greater or equal to 3.0V. When Vc is greater than or equal to 3.0V the power relay, NOR (1) energizes and the high power supply (7) is activated and the embodiment is in HPM mode.

The power consumption of an AD (8) varies based on its modes of operations. If the AD (8) is a laptop with a rechargeable battery the power consumption of the AD (8) depends on a number of conditions. These conditions include the real time battery charge level (or percentage), laptop operational mode: on, off, standby or hibernate. Standby and hibernate modes are power consumption modes wherein the laptop reduces or turns-off components, such as display backlight, hard drive, etc. In battery charging mode either partially or completely discharged the laptop (AD (8)) consumes maximum power and the embodiment is in HPM. When the laptop battery is fully charged the laptop will consume less than the maximum power consumption. In that mode the power supply may operate in LPM. As the AD (8) changes modes or battery charge conditions the embodiment changes modes from LPM to HPM or HPM to LPM as the real time power consumptions changes.

Second Embodiment

Microprocessor Controlled with Battery or Ultra Capacitor

This embodiment (see FIG. 4) is a power supply or battery charging system comprising two power supplies, low power and high power. The low power supply is designed to supply the minimum possible power requirement of the AD (33). The high power supply is designed to supply the maximum power requirement of the AD (33). The high power supply is turned on or off based on the real time power consumption of the AD (33). The power consumption of the AD (33) is monitored by a current shunt monitoring circuit (CSMC) (27) and an Automation Controller (AC) (38). The AC (38) contains a microprocessor or microcontroller, input/output (I/O) interfaces and memory (39) that contains the automation program. The AC (38) provides the control signal to activate the high power supply (31), low power supply (26) and the charging unit (34) depending on the required operating mode.

The embodiment is of a power supply and/or battery charger (PS/BC) system used to power associated devices AD (33) with power consumption characteristics that include high power consumption (1% to 50% of the time) and low power consumption (50%-99% of the time) or off. This embodiment is a design to power a rechargeable laptop computer. The exact ratio of time the AD (33) requires high power versus low power is not critical.

Figure 4:
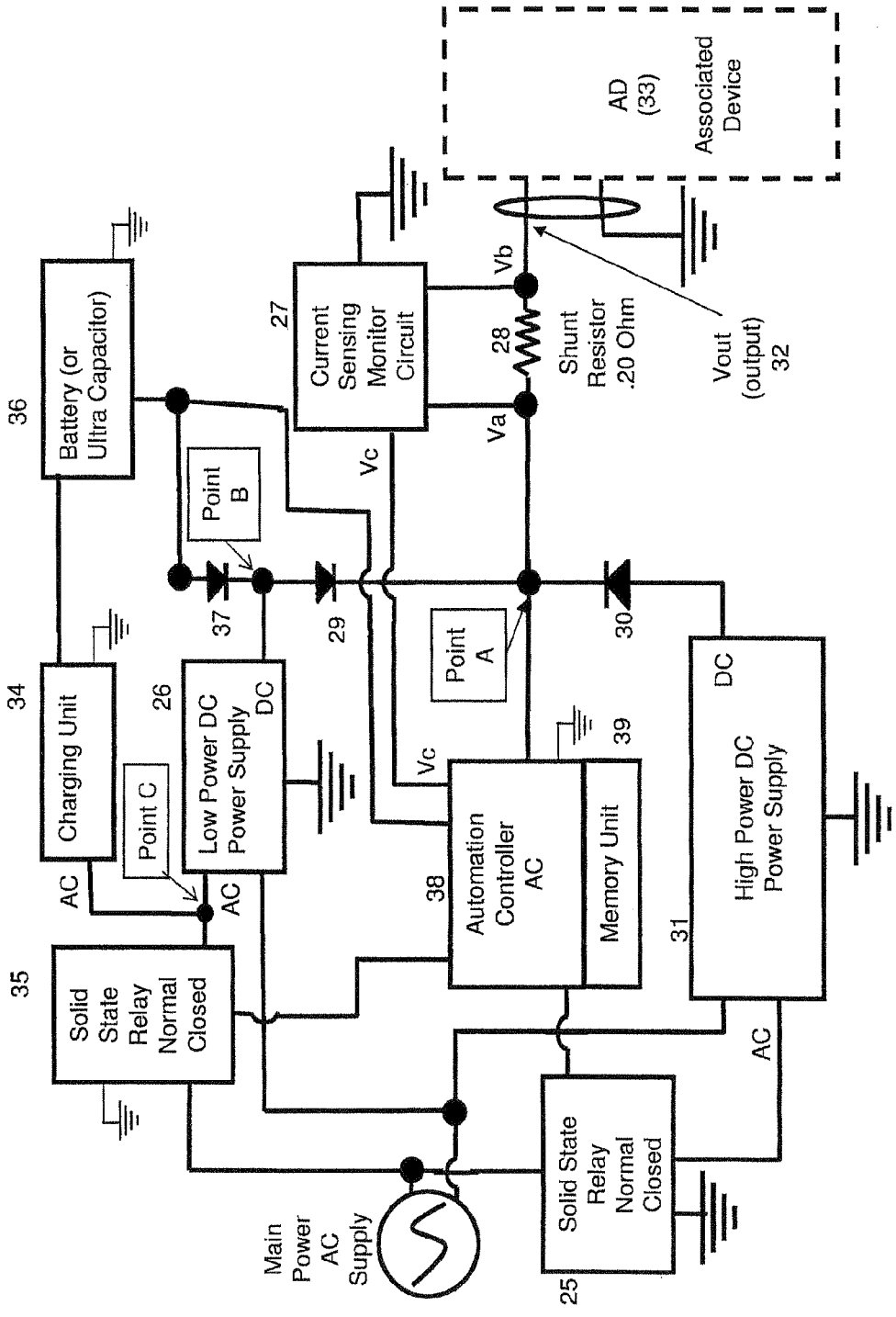
FIG. 4 shows a power supply in accordance with the embodiment number 2.

The embodiment discussed herein comprises a power supply or battery charger (PS/BC) designed to minimize the power consumption of itself during the times the AD (33) is disconnected, in stand-by, sleep mode or off. FIG. 4 shows a power supply or battery charger (PS/BC) in accordance with the embodiment described below.

The embodiment switches among 3 modes: off, low power mode (LPM) and high power mode (HPM) depending on the real time power consumption requirements of the AD (33). The power consumption of the AD (33) varies based on the following conditions: stand-by or sleep (reduced power consumption) mode, turned off, battery charging mode, disconnected or normal active mode (on). The following description is of the embodiment of a laptop power supply. In the description the AD (33) represents a laptop computer.

This embodiment, as depicted in FIG. 4, includes a high power supply (31) Manufacturer: Dell Model Number: ADP-70EB and a low power supply (26) Manufacturer: CUI Inc., Model Number: ESPS240025-P5P, two normally closed, NC, power relays (NCR) (25, 35) Omron Model Number: G6C-2114P-US-DC5, a current shunt monitor circuit (CSMC) (27) Analog Devices Model Number: AD8212, a (0.2 Ohm) shunt resistor (28), three diodes (29, 30, 37), Charging Unit (CU) (34), a battery (or ultra capacitor) (36), an Automation Controller (38) and a single output (32) Vout. The Automation Controller, AC (38), controls the state of the relays (25, 35). The state of the NC (normally closed) relay (25) activates or deactivates the high power supply (31). The state of the NCR (35) activates or deactivates the low power supply (26) and the charging unit (34), simultaneously. The embodiment is designed to operate in high power mode if the battery fails. In this embodiment the terms battery {as part of the embodiment} and ultra capacitor are considered interchangeable because they perform the same function. The program/automation instructions are contained in the non-volatile memory unit (39) within the AC (38). The software code of the AC (38) instructions are not included here.

The outputs of the low power supply (26) and the high power supply (31) are connected to each other with 2 diodes (29, 30) in opposing directions at point A. The anode of each diode (29, 30) is connected to its associated power supply and the cathodes of each of the diodes (29, 30) are connected at point A. The positive terminal of the battery (36) is connected to the circuit at point B via diode (37). The positive terminal of the battery is also connected to the AC (38). The shunt resistor (28) is connected in series between the diodes (29, 30) at point A and the AD (33) via the single output (32).

The Charging Unit (34) is connected directly to the battery (or ultra capacitor) (36). Its function is to charge the battery or ultra capacitor. The CU (34) is activated when the NCR (35) is de-energized by the AC (38). This occurs when the AC (38) determines that the battery or ultra capacitor (36) requires re-charging. It also occurs whenever the embodiment is in low power mode (LPM).

The battery (36) supplies the power to the CSMC (27) and the AC (38) when the power supply is in off mode. When in off mode the embodiment uses power from the main power AC supply (wall) only to re-charge the battery (36) as necessary.

The normally closed relay (NCR) (35) is controlled by the automation controller, AC (38). One side of the relay is connected to the main power AC supply. The other side of the relay is connected to the CU (34) and the low power supply (26) at point C. The control/energizing input to the normally closed relay, NCR (35) is connected to the AC (38).

The NCR (25) is controlled by the AC (38). One side of the relay is connected to the main power AC supply. The other side of the relay is connected to the high power supply (31). The control/energizing input to the NCR (25) is connected to the AC (38).

The CSMC (27) is powered by the low power supply (26) whenever the NCR (35) is de-energized by the AC (38). The CSMC (27) is powered by the battery (36) whenever the relay (35) is energized by the AC (38). The CSMC (27) monitors the difference in voltage, Vdiff, across the shunt resistor (28). The CSMC (27) is connected in parallel to the shunt resistor (28). The high side input of the CSMC (27) is connected to the circuit between point A and the shunt resistor (28). The low side input of the CSMC (27) is connected to the circuit between the shunt resistor (28) and the output of the power supply (32). The output of the CSMC (27), control signal Vc, is equal to approximately 1000 times the difference in voltage across the shunt resistor (28), Vdiff. The output of the CSMC (27) is connected to a monitor input of the AC (38).

The embodiment initially operates in high power mode when the embodiment is plugged into or attached to the main power source (40, 42). When power is initially applied to the embodiment the battery charging begins and the AC (38) determines the proper mode of operation (off, LPM or HPM) (43). In off mode the battery (36) supplies power to the AC (38), if the battery (36) is charged (43, 44, 45, 46)—see FIG. 5. If the battery (36) is discharged below a pre-defined level the AC (38) switches (43, 44, 45, 47) the embodiment into low power mode. In low power mode the low power supply (26) and the charging unit (34) are active. Additionally the embodiment is in LPM whenever the battery (36) needs to be recharged or when the AD (33) is connected and consumes less power than the maximum power supply capability of the low power supply (26). In the LPM mode the AD (33), the AC (38) and the CSMC (27) are powered by the low power supply (26).

The embodiment operates in off mode when the associated device AD (33) is disconnected from the embodiment or turned off (requires no power). In the off mode the AC (38) is powered by the battery (36). If the battery (36) charge drops below a pre-defined level the AC (38) de-energizes the normally closed relay (NCR) (35) to activate the charging unit (34) and low power DC power supply (26). When the NCR (35) is de-energized the embodiment is in low power mode (LPM). See FIG. 5 (43, 44, 45, 46, 47).

The embodiment operates in LPM when the NCR (35) is de-energized. In LPM the charging unit (34) charges the battery (36). In LPM the low power supply (26) supplies power to the AC (38) and the AD (33), if connected, and the AD (33) requires power.

The embodiment operates in high power mode (HPM) when the NCR (25) is de-energized. The embodiment operates in HPM when the AD (33) requires more power than the low power supply (26) can provide. See FIG. 5 (43, 41).

The operating instructions for the AC (38) reside in its memory unit (39). The AC (38) monitors the output of the CSMC (27), provides the control signal for the NC relay (25), monitors the voltage of the battery (36) and provides the control signal for the NC relay (35). The AC (38) de-activates relay (25) when the AD (33) is on and requires the high power mode. The AC (38) de-activates the NCR (35) when the battery (36) requires re-charging or the AD (33) requires less than or equal to 200 mW or both the battery (36) requires re-charging and the AD (33) requires less than or equal to 200 mW.

The embodiment operates in LPM whenever the AD (33) requires less than or equal to 200 mW. In the LPM mode the high power supply (31) is inactive because it is disconnected from the main power source by the relay, NCR (25) in the open state. The power mode is chosen by the AC (38) based on the real time power consumption of the AD (33). The CSMC (27) monitors the power consumption of the AD (33) by monitoring the current through the shunt resistor (28). The CSMC (27) monitors the output current level by measuring the difference in voltage, Vdiff between the two sides (high and low side) of the shunt resistor (28), Vdiff=Va−Vb. The value of the shunt resistor (28) is determined by the maximum power capability of the low power supply (26), in this embodiment the value of the shunt resistor is 0.2 Ohms. The value of the shunt resistor (28) is determined to be such that the voltage drop, Vdiff, across the shunt resistor (28) is approximately 0.0030 volts when the power consumed by the AD (33) equals 80% of the maximum power capability of the low power supply (26). In this embodiment of the invention the maximum power capability of the low power supply (26) is 250 mW. In this embodiment of the invention the CSMC (27) chosen provides a gain of approximately 1000 times the input voltage, Vdiff. In this embodiment the CSMC (27) used is an Analog Devices integrated circuit, part number AD8212. The output voltage of the CSMC (27) (Vc) will be approximately 1000 times the input voltage, Vdiff. Therefore when the power consumption of the AD (33) is zero watts the output of the CSMC (27), Vc, will be approximately zero volts. Hence when the power consumption of the AD (33) is 200 mW, 80% of the power capability of the low power supply (26), the output of the CSMC (27) (Vc) will be approximately 3V. The output of the CSMC (27), Vc, is a direct reflection of the real time power consumption of the associated device AD (33) as a function of the current flow through the shunt resistor (28) to the AD (33).

Figure 5:
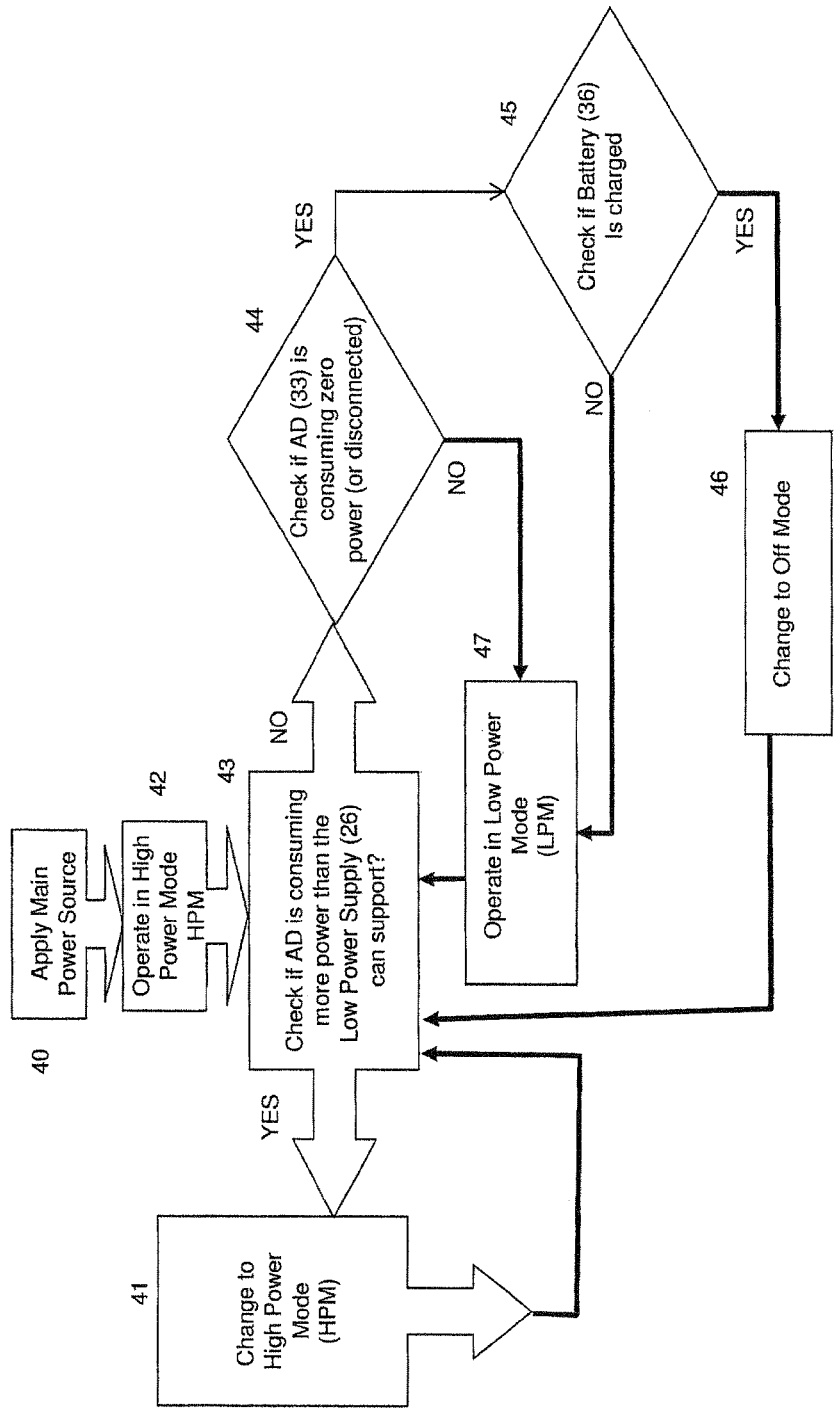
FIG. 5 shows a High Level Flow Chart of the Operational Logic of the embodiment number 2.

Therefore this embodiment, as depicted in FIGS. 4 and 5, operates as follows:

1) The automation controller (AC) (38) controls the operating mode of the embodiment. The AC (38) determines the operating mode by monitoring the power consumption of the AD (33) utilizing the output voltage of the current sensing monitor circuit (CSMC) (27) as an input signal. The AC (38)

also monitors the battery charge level via a second input. See FIG. 5 for a flowchart of the operation of this embodiment.

2) The embodiment operates in high power mode when the embodiment is initially plugged into or attached to the main power source. When power is initially applied to the embodiment the battery (36) charging begins and the AC (38) determines (43, 44, 45) the proper mode of operation (off, LPM or HPM). Since the battery (36) has never been charged the embodiment will activate (47) the low power supply (26) and the charging unit (34), until the battery (36) is charged. The low power supply (26) and the charging unit (34) are activated when the AC (33) de-activates the normally closed relay, NCR (35). If the AD (33) is attached to the embodiment and the AD (33) is off or in an operational mode that consumes power at a level that the low power supply (26) can supply the needed power (in this embodiment 200 mW), the embodiment switches to low power mode, LPM. If the AD (33) is attached to the embodiment and the AD (33) in an operational mode that consumes power at a level that the low power supply (26) cannot supply (greater than 80% of the maximum power rating for the low power supply (26)) the embodiment remains (41) in HPM. In low power mode the low power supply (26) and the charging unit (34) are active. In LPM mode the AD (33), the AC (38) and the CSMC (27) are powered by the low power supply (26). In HPM the AD (33) and AC (38) and the CSMC (27) are powered by the high power supply (31).

Once the battery (36) is initially charged the embodiment will operate in either of its operating modes, off, LPM or HPM by monitoring the output of the CSMC (27). When the output of the CSMC (27) goes to zero for a pre-defined period (based on the intended use of the embodiment) the AC (38) switches (46) the embodiment to off mode. When the output of the CSMC (27), Vc, is greater than zero volts and less than 3.0V the AC (38) switches (47) the embodiment to low power mode, LPM.

3) The real time power consumption of the AD (33) is monitored by the CSMC (27) and the AC (38). When the power consumption of the AD (33) causes Vdiff to exceed 0.003V the current sensor output Vc, exceeds 3V. Vdiff equal to 0.003V is called the Low Power Threshold (43).

4) If Vc is equal to or greater than 3V, the AC (38) de-energizes the normally closed relay (NCR) (25), connecting the main power source to the high power supply (31). When NCR (25) is de-energized the embodiment is in high power mode (HPM), When the NCR (25) is de-energized, the main power source energizes the high power supply (31). When the high power supply (31) is energized it supplies power to the AD (33), CSMC (27) and AC (38) via diode (30). This will occur when the AD (33) consumes more power than 80% of the power rating of the low power supply (26). In this embodiment the power rating of the low power supply (26) is 250 mW.

In HPM the AC (38) monitors the battery (36) charge level. If the battery (36) is discharged the AC (38) will de-energize the normally closed relay, NCR, (35). When the NCR (35) is de-energized the charging unit, CU (34) and the low power supply (26) are energized. The CU (34) will charge the battery (36) until fully charged (45). Once the battery (36) is fully charged the AC (38) will energize the NCR (35) to de-activate the CU (34) and the low power supply (26), while in HPM.

5) If Vc is less than 3V and greater than zero (0) volts, the AC (38) de-energizes (closes) the normally closed relay, NCR (35) placing the embodiment in low power mode, LPM. In LPM the AC (38) energizes NCR (25). When NCR (25) is energized the high power supply (31) is disconnected from the main power source and is de-activated. When the high power supply is de-energized the low power supply (26) provides power to the CSMC (27), the AC (38) and the AD (33). This will occur if the AD (33) is in stand-by or low power consumption mode.

6) If Vc is equal to zero volts, the AC (38) energizes the NCRs (25 and 35), placing the embodiment in off mode (46). When the AD (33) is disconnected from the embodiment or turned off the power consumption becomes zero. When the power consumption of the AD (33) is zero the current through the shunt resistor (28) is zero. When the current through the shunt resistor (28) is zero, Vdiff will be zero. When Vdiff is zero, Vc will be zero. If the battery (36) is charged (45) and Vc becomes zero volts while the embodiment is in HPM or LPM mode, the embodiment changes to off mode. If the battery (36) requires charging and Vc becomes zero volts while the embodiment is in HPM mode, the embodiment changes (47) to LPM. If the battery (36) requires charging and Vc becomes zero volts while the embodiment is in LPM the embodiment will remain in LPM until the battery (36) is charged. If Vc is zero, when the battery (36) charging is complete the embodiment will change to off mode.

7) If the embodiment is unplugged or disconnected from the main power source the embodiment will default to LPM when re-connected to the main power source if the battery is not fully depleted. If the AD (33) requires the embodiment to be in HPM when the embodiment is connected to the main power source the embodiment initially operates in LPM briefly until AC (38) determines Vc is greater than or equal to 3V. When Vc is greater than or equal to 3V the AC (38) energizes NCR (25). When NCR (25) is de-energized the high power supply (31) is activated and the embodiment is in RPM mode.

8) The embodiment will operate in either LPM or HPM if the battery fails or becomes fully depleted depending on the power consumption of the AD (33).

The power consumption of an AD (33) varies based on its modes of operations. If the AD (33) is a laptop with a rechargeable battery the power consumption of the AD (33) depends on a number of conditions. These conditions include the real time battery charge level (or percentage), laptop operational mode: on, off, standby or hibernate. Standby and hibernate modes are power consumption modes wherein the laptop reduces or turns-off components, such as display backlight, hard drive, etc. In battery charging mode, when the laptop battery is either partially or completely discharged, the laptop (AD (33)) consumes maximum power and the embodiment is in HPM. When the laptop battery is fully charged the laptop will consume less than the maximum power consumption. In that mode the embodiment may operate in LPM. As the AD (33) changes modes or battery charge level the embodiment changes modes among off (46), LPM (47) or HPM (41) as the real time power consumption of the laptop (AD (33)) changes.

In this embodiment the normally closed relay maybe replaced with normally open relays based on the requirements of the intended use.

The system can also be embodied as a power supply for a flat panel TV. This embodiment is utilized to reduce the power consumption of the TV when turned off. Flat panel TVs consume power when turned off, typically 0.4 to 3 W. This embodiment incorporates the same power supply utilized by the flat panel TV as the high power supply. The embodiment includes the low power supply (26) and the other components in the same configuration as either of the previous embodiments. In this embodiment the power supply power consumption in off mode is reduced up to 100% from the typical power consumption in off mode.

This system is described in three additional embodiments to illustrate three additional possible implementations to the two original embodiments described in the original U.S. Pat. No. 7,843,088.

Third Embodiment

Figure 6:
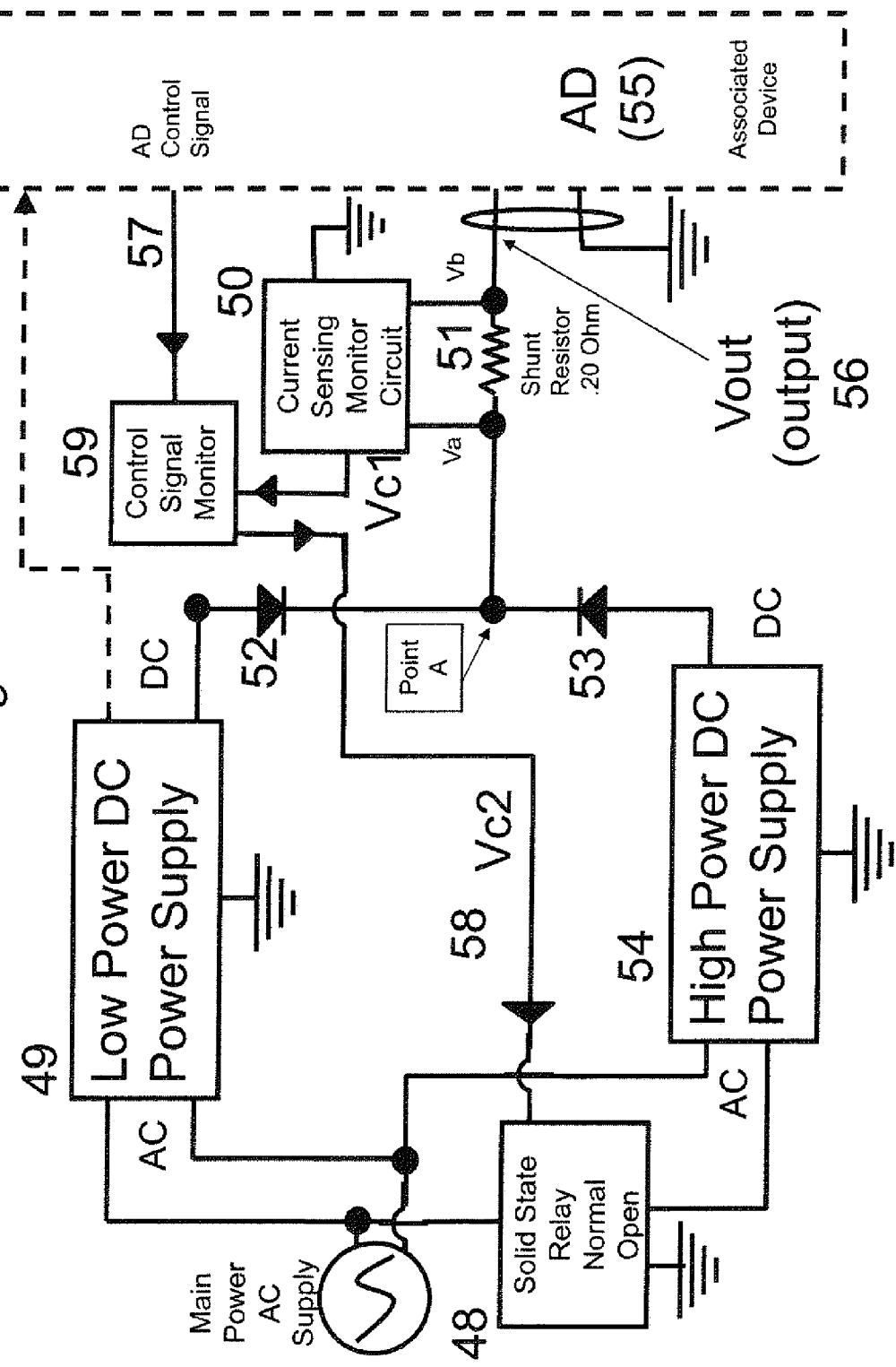
FIG. 6 shows a power supply in accordance with the embodiment number 3.
Figure 7:
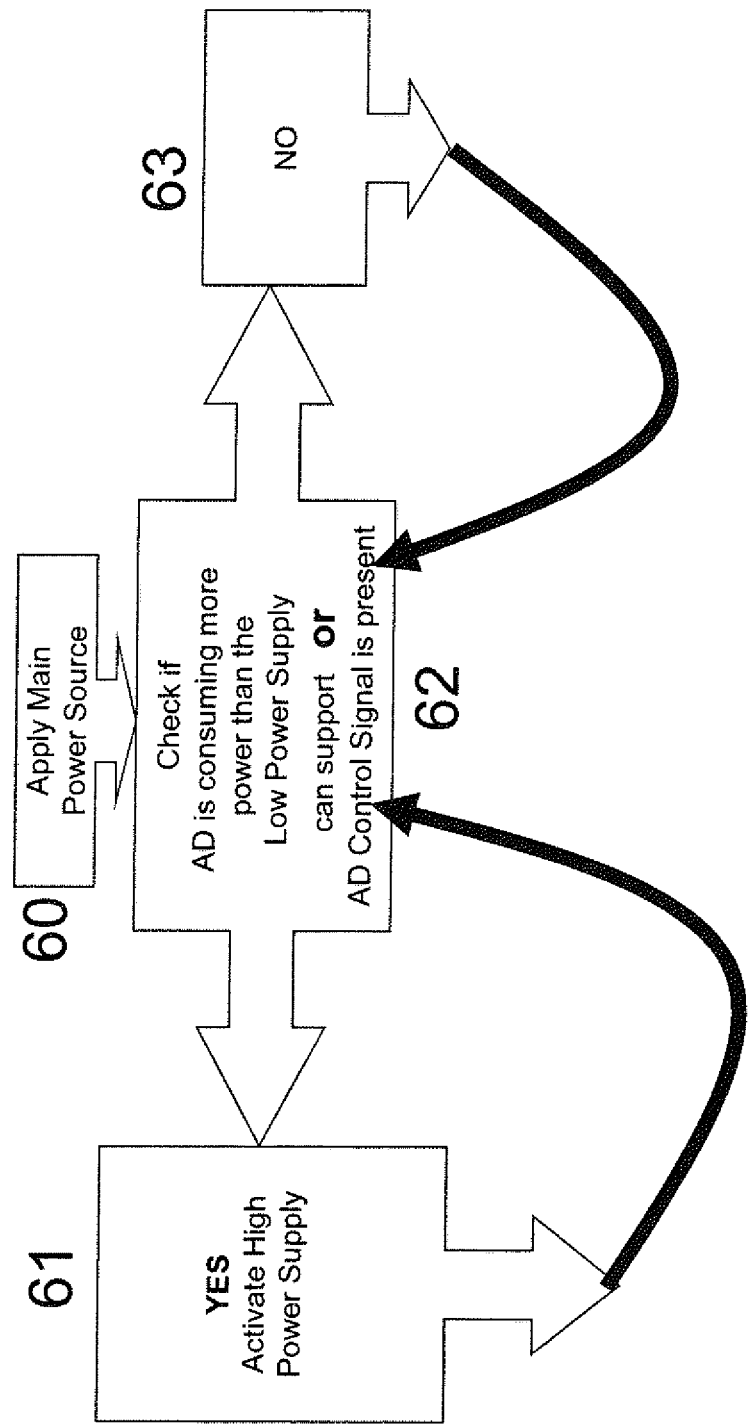
FIG. 7 shows a High Level Flow Chart of the Operational Logic of the embodiment number 3.
Figure 8:
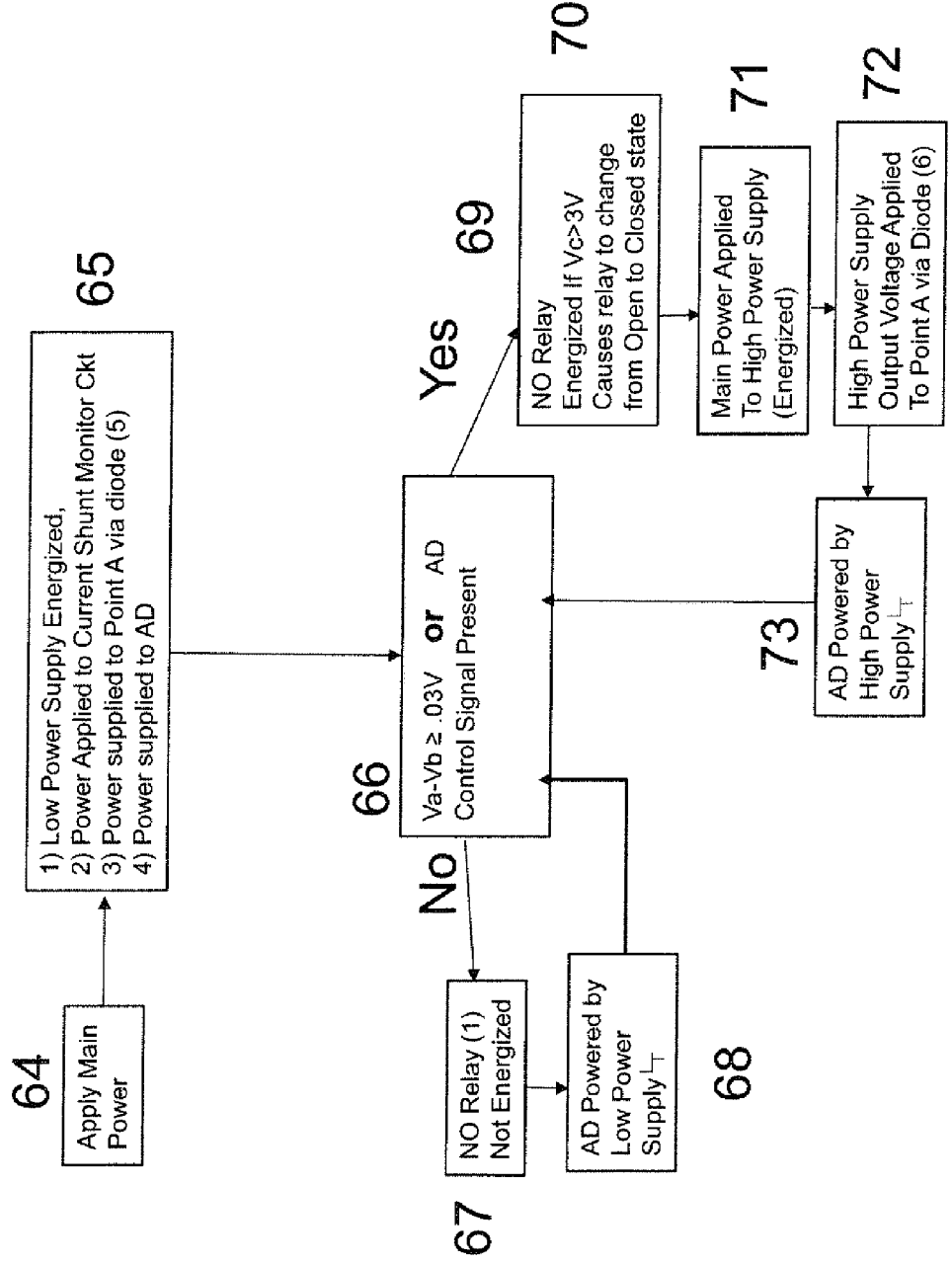
FIG. 8 shows a Detailed Level Flow Chart of the Operational Logic of the embodiment number 3.

The following embodiment, as depicted in FIG. 6, is of a power supply and/or battery charger (PS/BC) system used to power associated devices (55) (AD) with power consumption characteristics that include low power consumption (50% to 99% of the time) and high power consumption (1%-50% of the time). The third embodiment operating flow charts are depicted in FIGS. 7 and 8. This embodiment is a design to power a rechargeable laptop computer that includes a low power or standby type mode, or another device such as a television. The exact ratio of time the AD (55) requires high power versus low power is not critical. This embodiment includes a control signal from the AD (57) that can be used to control the activation of the high power supply.

The embodiment discussed herein includes a power supply or battery charger (PS/BC) designed to minimize the power consumption of itself during the times the AD (55) is disconnected, in stand-by, sleep mode or off, or when control signal (57) is activated. FIG. 6 shows a power supply or battery charger (PS/BC) in accordance with this embodiment.

The embodiment switches between a low power mode (LPM) and high power mode (HPM) depending on the real time power consumption requirements of the AD (55) or the state of the AD Control Signal (57). The logical determination is identified in FIGS. 7 and 8 as (62) and (66). In this embodiment a control signal from the AD may also be used to determine the mode of operation. The control signal (57) can be a signal from a television to turn the television off or to a standby mode as indicated by a hand held remote control. The power consumption of the AD (55) varies based on the following conditions: stand-by or sleep (reduced power consumption) mode, turned off, battery charging mode, disconnected or normal active mode (on).

This embodiment comprises one high power supply (54) Manufacturer: Dell Model Number: ADP-70EB and one low power supply (49) Manufacturer: CUI Inc., Model Number: ESPS240025-P5P, one normally open solid state power relay (NOR) (48) Teledyne Model Number: SH25D25, one current shunt monitor circuit (CSMC) (50) Analog Devices Model Number: AD8262, one (0.2 Ohm) shunt resistor (51), two diodes (52, 53), a Control Signal Monitor (59) and a single output (56) Vout. The Control Signal Monitor (CSM) (59) consists of an OR gate with inputs from the CMSC (50) Vc1 and AD Control Signal (57) and output Vc2 (58). In some circumstances the CSM (59) may need logic, such as a flip-flop, to lock-in or hold the control signal (57). The CSM (59) controls the state of the NOR (48). The state of the NOR (48) activates or deactivates the high power supply (54). The outputs of the low power supply (49) and the high power supply (54) are connected to each other with two diodes (52, 53) in opposing directions at point A. The anode of each diode is connected to its associated power supply and the cathodes of each of the diodes (52, 53) are connected at point A. The shunt resistor (51) is connected in series between the diodes (52, 53) at point A and the AD (55) via the single output Vout (56). The output (56) may power the lower and high power modes of AD (55). The CSMC (50) monitors the difference in voltage across the shunt resistor (51). The CSMC (50) is connected in parallel to the shunt resistor (51). The high side input of the CSMC (50) is connected to the circuit between point A and the shunt resistor (51). The low side input of the CSMC (50) is connected to the circuit between the shunt resistor (51) and the output of the power supply (56). The output of the CSMC (50), control signal Vc1, is equal to approximately 1000 times the difference in voltage across the shunt resistor (51), Vdiff. The output of the CSMC (50) Vc1 is one of the inputs to the CSM (59). The second input to the CSM (59) is a control signal (57) from the AD (55). The AD (55) activates the control signal (57) when the AD (55) requires the embodiment to be in HPM. The AD (55) de-activates the control signal (57) when the AD (55) does not need the embodiment to be in HPM. The CSM (59) controls the operation of the NOR (48), using Vc2 (58) as a control signal. The CSM (59) activates (closes) the NOR (48) when either the AD Control Signal (57) is present or Vc1 signal is present at or above a pre-defined level, 3 volts in this embodiment. If neither signal is present the CSM (59) output signal Vc2 (58) is de-activated, which deactivates the NOR (48).

The embodiment initially operates in low power mode (LPM) when the embodiment is plugged into or attached to the main AC power source (60, 62, 64, 65). The low power supply (49) is active whenever the embodiment is connected or attached to the main AC power source. In the LPM mode the AD (55) and the CSMC (50) are powered by the low power supply (49). The low power supply (49) may also include a direct connection to the AD (55) that may be used to power low power consumption circuits, such as a television hand-held remote control monitor circuit. The embodiment operates in LPM whenever the AD (55) is in stand-by or sleep mode, off or disconnected from the AD (55) or whenever the AD (55) requires less than or equal to 200 mW or when the control signal (57) is activated. In the LPM mode the high power supply (54) is inactive because it is disconnected from the main AC power source by the NOR (48) in the open state. The power mode is determined (62, 66) by the real time power consumption of the AD (55) and the AD Control Signal (57). The CSMC (50) monitors the power consumption of the AD (55) by monitoring the current through the shunt resistor (51). The CSMC (50) monitors the output current level by measuring the difference in voltage, Vdiff, between the two sides (high and low side) of the shunt resistor (51), Vdiff=Va−Vb (66). The value of the shunt resistor (51) is determined by the maximum power capability of the low power supply (49), in this embodiment the value of the shunt resistor (51) is 0.2 ohms. The value of the shunt resistor (51) is determined to be such that the voltage drop, Vdiff, across the shunt resistor (51) is approximately 0.0030 volts when the power consumed by the AD (55) equals 80% of the maximum power capability of the low power supply (49). In this embodiment the maximum power capability of the low power supply (49) is 250 mW. In this embodiment the CSMC (50) chosen provides a gain of approximately 1000 times the input voltage, Vdiff. In this embodiment the CSMC (50) used is an Analog Devices integrated circuit, part number AD8262, The output voltage of the CSMC (50) (Vc1) will be approximately 1000 times the input voltage, Vdiff. Therefore when the power consumption of the AD (55) is zero watts the output of the CSMC (50), Vc1, will be approximately zero volts. Hence when the power consumption of the AD (55) is 200 mW, 80% of the power capability of the low power supply (49), the output of the CSMC (50) (Vc1) will be approximately 3.0V. The output of the CSMC (50), Vc1, is a direct reflection of the real time power consumption of the AD (55) as function of the current flow through the shunt resistor (51) to the AD (55).

The output voltage of the CSMC (50) (Vc1) is connected to one of the 2 inputs of the CSM (59). The CSM (59) can be an OR gate with two inputs, Vc1 and the AD Control Signal (57) or may also include lock-in logic on the input for the control signal (57). The output of the CSM (59) is Vc2 (58). When Vc2 is present the NOR (48) is activated and the high power supply (54) is activated. In this embodiment the NOR (48) is a solid-state relay with optical isolation, manufactured by Teledyne, model SH24D25. The NOR (48) is a normally open (NO) relay. When Vc2 is 2.9V or less the NOR (48) is in the open (circuit) mode. When the NOR (48) is in open mode the main AC power source is disconnected from the high power supply (54), deactivated. In this mode (low power mode, LPM) the low power supply (49) is supplying power to the CSMC (50) and the AD (55). When Vc2 is at or above 3.0V the NOR (48) is in closed (circuit) mode. When the NOR (48) is in closed mode the main AC power source (AC power) is connected to the input of the high power supply (54), via the NOR (48), which is closed/energized. In this mode, high power mode (HPM), the high power supply (54) is supplying power to the AD (55), via diode (53) and the shunt resistor (51).

The low power supply (49) and the high power supply (54) are connected to the shunt resistor (51) at point A via diodes (52, 53). The diodes (52, 53) protect the power supplies from reverse current damage.

Therefore the embodiment operates as follows:

1) When the invention is attached to the main power source (60, 64, 65) the invention operates in LPM low power mode. The low power supply (49) is energized 100% of the time the embodiment is connected to the main power source. The low power supply (49) also supplies power to the AD (55) when the embodiment is in LPM mode.

2) The real time power consumption of the AD (55) is monitored by the CSMC (50) via Vdiff. If the power consumption causes Vdiff to exceed 0.0030V the current sensor output Vc1, exceeds 3.0V. Vdiff equal to 0.0030V is called the Low Power Threshold.

3) The state of the AD Control Signal (57) is monitored via the CSM (59) (62, 66). If the control signal (57) is present the signal Vc2 (58) is present. If an "on" signal from a television remote control circuit is on the control signal (57) is on or present. Likewise, when a remote control circuit in a television produces a "standby" signal the control signal is off or not present.

4) The state of Vc1 is also monitored by the CSM (59) (62, 66). If Vc1 is equal or greater than 3.0V, the signal Vc2 (58) is present.

5) The NOR (48) is energized, whenever Vc2 (58) is present. When the NOR (48) is energized the main AC power source energizes the high power supply (54). Refer to FIGS. 7 and 8 (62, 61, 66, 69, 70, 71, 72, 73).

6) When the NOR (48) is energized the main AC power source energizes the high power supply (54). When the high power supply (54) is energized it supplies power to the AD (55) via diode (53) and the shunt resistor (51) and Vout (56).

7) If the AD (55) reduces its power consumption such that Vdiff goes below 0.0030V, the output of the current sensor (50), Vc1, goes below 3.0V. When Vc1 goes below 3.0V, the CSM (59) will not accept the signal. If the AD (55) also de-activates the AD Control Signal (57) with Vc1 less than 3.0 volts the CSM de-energizes Vc2. If Vc2 is de-energized the NOR (48) is de-energized disconnecting the main AC power source from the high power supply (54). When the high power supply (54) is de-energized the low power supply (49) provides power to the current sensor and the AD (55) via the shunt resistor (51) and Vout (56). Refer to FIGS. 7 and 8 (61, 62, 63, 66, 67, 68).

If the AD (55) is consuming more than 200 mW when the embodiment is operating in HPM. The high power supply (54) provides power to the AD (55) via diode (53) and the shunt resistor (51). In high power mode (HPM) Vdiff is greater than or equal to 0.0030V (62, 61, 66, 69, 70, 71, 72, 73). In this mode the CSMC (50) continues to monitor Vdiff. If the real time power consumed by the AD (55) is reduced below the LPM threshold, Vdiff becomes less than 0.0030V. This can occur if the AD (55) is disconnected from the embodiment or the AD (55) changes to a stand-by or low power consumption mode. When this occurs the output of the CSMC (50), Vc, drops below 3.0V. When Vc is less than 3.0V the CSM (59) does not accept the signal. If simultaneously the AD Control Signal (57) is also de-activated the CSM (59) de-energizes the Vc2 (58) signal and the NOR (48) is de-energized. If Vc1 becomes less than 3.0 volts and the AD Control Signal (57) remains active, Vc2 remains energized and the embodiment will remain in HPM. If the AD Control Signal (57) is deactivated and Vc1 remains at greater than or equal to 3.0 volts the embodiment will remain in HPM mode. When the NOR (48) is de-energized the main AC power source is disconnected from the high power supply (54) and the output voltage of the high power supply (54) becomes zero. Once the main AC power source is disconnected from the high power supply (54) the embodiment is in low power mode (LPM). In LPM the low power supply (49) provides power to the AD (55) via diode (52) and shunt resistor (51) and provides power to operate the CSMC (50).

If the AD (55) is disconnected from the embodiment while the embodiment is in HPM mode, the embodiment changes to LPM. When the AD (55) is disconnected from the embodiment no current flows through the shunt resistor (51) and the AD Control Signal (57) is not present. When Vdiff is zero, Vc1 will be zero. If simultaneously, the AD Control Signal (57) is not present the CSM (59) will de-energize Vc2 which causes the NOR (48) to be de-energized. When the NOR (48) is de-energized the high power supply (54) is disconnected from the main AC power source. When the main AC power source is disconnected from the high power supply (54) the embodiment is in LPM.

If the embodiment is unplugged or disconnected from the main AC power source the embodiment will default to LPM when re-connected to the main AC power source (60, 62, 63, 64, 65, 66). If the AD (55) requires the embodiment to be in HPM when the embodiment is connected to the main AC power source the embodiment initially operates in LPM briefly until the CSMC (50) determines (62, 66) Vdiff is equal to or greater than 0.003V or the CSM (59) determines whether the control signal 57 is present. Once Vdiff is greater than or equal to 0.003V the output of the CSM (50) Vc, is greater or equal to 3.0V. When Vc is greater than or equal to 3.0V the CSM (59) energizes Vc2. When Vc2 is energized, the power relay, NOR (48) energizes and the high power supply (54) is activated and the embodiment is in HPM mode.

The power consumption of an AD (55) varies based on its modes of operations. If the AD (55) is a laptop with a rechargeable battery the power consumption of the AD (55) depends on a number of conditions. These conditions include the real time battery charge level (or percentage), laptop operational mode: on, off, standby or hibernate. Standby and hibernate modes are power consumption modes wherein the laptop reduces or turns-off components, such as display backlight, hard drive, etc. In battery charging mode, either partially or completely discharged, the laptop (AD (55)) consumes maximum power and the embodiment is in HPM. When the laptop battery is fully charged the laptop will consume less than the maximum power consumption. In that mode the power supply may operate in LPM. As the AD (55) changes modes or battery charge conditions the embodiment changes modes from LPM to HPM or HPM to LPM as the real time power consumptions changes.

Note, because of the direct connection between supply (49) and device (55) low power may be supplied to device (55) constantly.

Fourth Embodiment

Microprocessor Controlled with Battery or Ultra Capacitor

Figure 9:
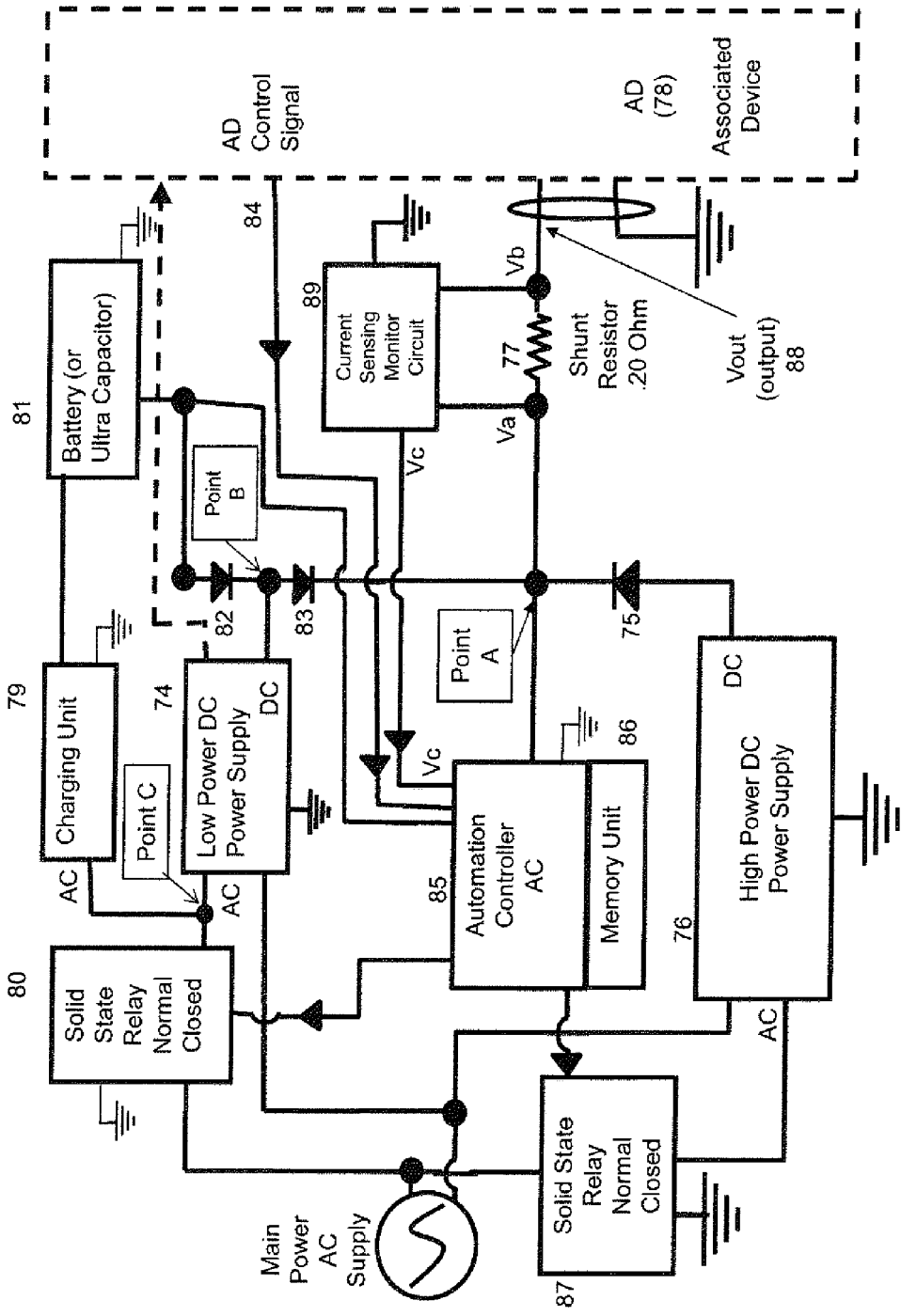
FIG. 9 shows a power supply in accordance with the embodiment number 4.

The embodiment is a power supply or battery charging system comprising two power supplies, low power and high power (see FIG. 9). The low power supply is designed to supply the minimum power requirement of the AD (78). The high power supply is designed to supply the maximum power requirement of the AD (78). The high power supply is turned on or off based on the real time power consumption of the AD (78) or the control signal (84). The control signal (84) may be a signal from a television remote control monitor circuit. The power consumption of the AD (78) is monitored by a current shunt monitoring circuit (CSMC) (89) and an Automation Controller (AC) (85). The AC (85) contains a microprocessor, input/output (I/O) interfaces and memory (86) that contains the automation program. The AC (85) provides the control signals to activate the high power supply (76), low power supply (74) and the charging unit (79) depending on the required operating mode.

The embodiment is of a power supply and/or battery charger (PS/BC) system used to power associated devices AD (78) with power consumption characteristics that include high power consumption (1% to 50% of the time) and low power consumption (50%-99% of the time) or off. This embodiment is a design to power a rechargeable laptop computer or another device that includes a low power or standby type mode, such as a television. The exact ratio of time the AD (78) requires high power versus low power is not critical.

The embodiments discussed herein comprises a power supply or battery charger (PS/BC) designed to minimize the power consumption of itself during the times the AD (78) is disconnected, in stand-by, sleep mode or off or a control signal is active. FIG. 9 shows a power supply or battery charger (PS/BC) in accordance with the embodiment described below.

The embodiment switches among 3 modes: off, low power mode (LPM) and high power mode (HPM) depending on the real time power consumption requirements of the AD (78). The power consumption of the AD (78) varies based on the following conditions: stand-by or sleep (reduced power consumption) mode, turned off, battery charging mode, disconnected or normal active mode (on).

This embodiment, as depicted in FIG. 9, includes 1 high power supply (76) Manufacturer: Dell Model Number: ADP-70EB and 1 low power supply (74) Manufacturer: CUI Inc., Model Number: ESPS240025-P5P, 2 normally closed, NC, power relays (NCR) (87, 80) Omron Model Number: G6C-2604P-US-DCS, 1 current shunt monitor circuit (CSMC) (89) Analog Devices Model Number: AD8262, 1 (0.2 Ohm) shunt resistor (77), 3 diodes (75, 82, 83), Charging Unit (CU) (79), 1 battery (or ultra capacitor) (81), 1 Automation Controller (85), an AD Control Signal (84) and a single output (88) Vout. The Automation Controller, AC (85), controls the state of the relays (80, 87). The state of the NCR (87) activates or deactivates the high power supply (76). The state of the NCR (80) activates or deactivates the low power supply (74) and the charging unit (79), simultaneously. The low power supply (74) may be connected directly to the AD (78) to power low power circuits that need to be on all of the time such as a hand held remote control monitor circuit for a television. The embodiment is designed to operate in high power mode if the battery (81) fails. In this embodiment the terms battery {as part of the embodiment} and ultra capacitor are considered interchangeable because they perform the same function. The program/automation instructions are contained in the non-volatile memory unit (86) within the AC (85). The software code of the AC (85) instructions are not included here.

The outputs of the low power supply (74) and the high power supply (76) are connected to each other with 2 diodes (75, 83) in opposing directions at point A. The anode of each diode (75, 83) is connected to its associated power supply and the cathodes of each of the diodes (75, 83) are connected at point A. The positive terminal of the battery (81) is connected to the circuit at point B via diode (82). The positive terminal of the battery is also connected to the AC (85). The shunt resistor (77) is connected in series between the diodes (75, 83) at point A and the AD (78) via the single output (88).

The Charging Unit, CU, (79) is connected directly to the battery (or ultra capacitor) (81). Its function is to charge the battery or ultra capacitor. The CU (79) is activated when the NCR (80) is de-energized by the AC (85). This occurs when the AC (85) determines that the battery or ultra capacitor (81) requires re-charging. It also occurs whenever the embodiment is in low power mode (LPM).

The battery (81) supplies the power to the CSMC (89) and the AC (85) when the power supply is in off mode. When in off mode the embodiment uses power from the main power AC supply (wall) only to re-charge the battery (81) as necessary.

The normally closed relay (NCR) (80) is controlled by the automation controller, AC (85). One side of the relay is connected to the main power AC supply. The other side of the relay is connected to the CU (79) and the low power supply (74) at point C. The control/energizing input to the normally closed relay, NCR (80) is connected to the AC (85).

The NCR (87) is controlled by the AC (85). One side of the relay is connected to the main power AC supply. The other side of the relay is connected to the high power supply (76). The control/energizing input to the NCR (87) is connected to the AC (85).

The CSMC (89) is powered by the low power supply (74) whenever the NCR (80) is de-energized by the AC (85). The CSMC (89) is powered by the battery (81) whenever the relay (80) is energized by the AC (85). The CSMC (89) monitors the difference in voltage, Vdiff, across the shunt resistor (77). The CSMC (89) is connected in parallel to the shunt resistor (77). The high side input of the CSMC (89) is connected to the circuit between point A and the shunt resistor (77). The low side input of the CSMC (89) is connected to the circuit between the shunt resistor (77) and the output of the power supply (88). The output (88) may supply AD (78) with power during both the low and high power modes. The output of the CSMC (89), control signal Vc, is equal to approximately 1000 times the difference in voltage across the shunt resistor (77), Vdiff. The output of the CSMC (89), Vc, is connected to a monitor input of the AC (85).

The embodiment initially operates in high power mode when the embodiment is plugged into or attached to the main power source (95, 97), FIG. 10. When power is initially applied to the embodiment the battery charging begins and the AC (85) determines the proper mode of operation (off, LPM or HPM) (90). In off mode the battery (81) supplies power to the AC (85), if the battery (81) is charged (90, 91, 92, 94). If the battery (81) is discharged below a pre-defined level the AC (85) switches (90, 91, 92, 93) the embodiment into low power mode. In low power mode the low power supply (74) and the charging unit (79) are active. Additionally the embodiment is in LPM whenever the battery (81) needs to be recharged or when the AD (78) is connected and consumes less power than the maximum power supply capability of the low power supply (74). In the LPM mode the AD (78), the AC (85) and the CSMC (89) are powered by the low power supply (74).

The embodiment operates in off mode when the associated device AD (78) is disconnected from the embodiment or turned off (requires no power). In the off mode the AC (85) is powered by the battery (81). If the battery (81) charge drops below a pre-defined level the AC (85) de-energizes the normally closed relay (NCR) (80) to activate the charging unit (79) and low power DC power supply (74). When the NCR (80) is de-energized the embodiment is in low power mode (LPM). Described in FIG. 9 (90, 91, 92, 93, 94).

The embodiment operates in LPM when the NCR (80) is de-energized. In LPM the charging unit (79) charges the battery (81). In LPM the low power supply (74) supplies power to the AC (85) and the AD (78), if connected, and the AD (78) requires power.

The embodiment operates in high power mode (HPM) when the NCR (87) is de-energized. The embodiment operates in HPM when the AD (78) requires more power than the low power supply (74) can provide or the AD Control Signal (84) is present as described in FIG. 10 (90, 96).

The operating instructions for the AC (85) reside in its memory unit (86). The AC (85) monitors the output of the CSMC (89) and the AD Control Signal (84), provides the control signal for the NCR relay (87), monitors the voltage of the battery (81) and provides the control signal for the NCR relay (80). The AC (85) de-activates (closes) relay (87) when the AD Control Signal (84) is present or the AD (78) is consuming more power than 200 mW, indicating the AD (78) requires the high power mode. The AC (85) de-activates (closes) the NCR (80) when the battery (81) requires re-charging or the AD (78) requires less than or equal to 200 mW or both the battery (81) requires re-charging and the AD (78) requires less than or equal to 200 mW.

The embodiment operates in LPM whenever the AD (78) is connected and consuming more than zero watts and less than or equal to 200 mW and the AD Control Signal (84) is not active. In the LPM mode the high power supply (76) is inactive because it is disconnected from the main power source by the relay, NCR (87) in the open state. The power mode is chosen by the AC (85) based on the real time power consumption of the AD (78) and the state of the AD Control Signal (84). The CSMC (89) monitors the power consumption of the AD (78) by monitoring the current through the shunt resistor (77). The CSMC (89) monitors the output current level by measuring the difference in voltage, Vdiff between the two sides (high and low side) of the shunt resistor (77), Vdiff=Va–Vb. The value of the shunt resistor (77) is determined by the maximum power capability of the low power supply (74), in this embodiment the value of the shunt resistor is 0.2 Ohms. The value of the shunt resistor (77) is determined to be such that the voltage drop, Vdiff, across the shunt resistor (77) is approximately 0.0030 volts when the power consumed by the AD (78) equals 80% of the maximum power capability of the low power supply (74). In this embodiment of the invention the maximum power capability of the low power supply (74) is 250 mW. In this embodiment of the invention the CSMC (89) chosen provides a gain of approximately 1000 times the input voltage, Vdiff. In this embodiment the CSMC (89) used is an Analog Devices integrated circuit, part number AD8262. The output voltage of the CSMC (89) (Vc) will be approximately 1000 times the input voltage, Vdiff. Therefore when the power consumption of the AD (78) is zero watts the output of the CSMC (89), Vc, will be approximately zero volts. Hence when the power consumption of the AD (78) is 200 mW, 80% of the power capability of the low power supply (74), the output of the CSMC (89) (Vc) will be approximately 3V. The output of the CSMC (89), Vc, is a direct reflection of the real time power consumption of the associated device AD (78) as a function of the current flow through the shunt resistor (77) to the AD (78).

Therefore this embodiment, as depicted in FIGS. 9 and 10, operates as follows:

1) The automation controller (AC) (85) controls the operating mode of the embodiment. The AC (85) determines the operating mode by monitoring the power consumption of the AD (78) utilizing the output voltage of the current sensing monitor circuit (CSMC) (89) as an input signal. The AC (85) also monitors the battery charge level via a second input. The AC (85) also monitors the state of the AD Control Signal (84). See FIG. 10 for a flowchart of the operation of this embodiment.

2) The embodiment operates in high power mode when the embodiment is initially plugged into or attached to the main power source (95, 97). When power is initially applied to the embodiment the battery (81) charging begins and the AC (85) determines the proper mode of operation (off, LPM or HPM), see FIG. 10, (95, 97, 98). Since the battery (81) has never been charged the embodiment will activate the low power supply (74) and the charging unit (79), until the battery (81) is charged (97, 98). The low power supply (74) and the charging unit (79) are activated when the AC (85) de-activates the normally closed relay, NCR (80). After the battery (81) is initially charged the embodiment operates in any of the 3 modes (off, LPM, HPM). If the AD (78) is attached to the embodiment and the AD (78) is off or in an operational mode that consumes power at a level that the low power supply (74) can supply (in this embodiment 200 mW) and the AD Control Signal (84) is not present, the embodiment switches to low power mode, LPM (90, 91, 92, 93). If the AD (78) is attached to the embodiment and the AD (78) is in an operational mode that consumes power at a level that the low power supply (74) cannot supply (greater than 80% of the maximum power rating for the low power supply (74)) or the AD Control Signal (84) is present, the embodiment operates in HPM (90, 96). In low power mode the low power supply (74) and the charging unit (79) are active. In LPM mode the AD (78), the AC (85) and the CSMC (89) are powered by the low power supply (74). In HPM the AD (78) and AC (85) and the CSMC (89) are powered by the high power supply (76).

3) Once the battery is initially charged the embodiment will operate in any of its operating modes, off, LPM or HPM by monitoring the output of the CSMC (89) and the state of the AD Control Signal (84) (90). When the output of the CSMC (89) goes to zero for a pre-defined period (based on the intended use of the embodiment) and the AD Control Signal (84) is not present, the AC (85) switches the embodiment to off mode (90, 91, 92, 94). When the output of the CSMC (89), Vc, is greater than zero volts and less than 3.0V and the AD Control Signal (84) is not present, the AC (85) switches the embodiment to low power mode, LPM (90, 91, 93).

4) The real time power consumption of the AD (78) is monitored by the CSMC (89) and the AC (85). When the power consumption of the AD (78) causes Vdiff to exceed 0.003V the current sensor output Vc, exceeds 3V. Vdiff equal to 0.003V is called the Low Power Threshold (90).

5) If Vc is equal to or greater than 3V or the AD Control Signal is present, the AC (85) de-energizes the normally closed relay (NCR) (87), connecting the main power source to the high power supply (76) (90, 96). When NCR (87) is de-energized the embodiment is in high power mode (HPM). When the NCR (87) is de-energized, the main power source energizes the high power supply (76). When the high power supply (76) is energized it supplies power to the AD (78), CSMC (89) and AC (85) via diode (75). This will occur when the AD (78) consumes more power than 80% of the power rating of the low power supply (74) or the AD Control Signal

(84) is present. In this embodiment the power rating of the low power supply (74) is 250 mW.

6) In HPM the AC (85) monitors the battery (81) charge level. If the battery (81) is discharged the AC (85) will de-energize the normally closed relay, NCR, (80) (99, 100, 101). When the NCR (80) is de-energized the charging unit, CU (79) and the low power supply (74) are energized. The CU (79) will charge the battery (81) until fully charged. Once the battery (81) is fully charged the AC (85) will energize the NCR (80) to de-activate the CU (79) and the low power supply (74), while in HPM (99, 100, 101).

7) If Vc is less than 3V and greater than zero (0) volts and the AD Control Signal (84) is not present, the AC (85) de-energizes (closes) the normally closed relay, NCR (80) placing the embodiment in low power mode, LPM (90, 91, 93). In LPM the AC (85) energizes NCR (87). When NCR (87) is energized the high power supply (76) is disconnected from the main power source and is de-activated. When the high power supply is de-energized the low power supply (74) provides power to the CSMC (89), the AC (85) and the AD (78). This will occur if the AD (78) is in stand-by or low power consumption mode.

8) If Vc is equal to zero volts and the AD Control Signal (84) is not present, the AC (85) energizes the NCRs (80 and 87), placing the embodiment in off mode. When the power consumption of the AD (78) is zero or the AD (78) is disconnected the current through the shunt resistor is zero. When the current through the shunt resistor is zero, Vdiff will be zero. When Vdiff is zero, Vc will be zero. If the battery (81) is charged and Vc becomes zero volts while the embodiment is in HPM or LPM mode and the AD Control Signal (84) is not present the embodiment changes to off mode (90, 91, 92, 94). If the battery (81) requires charging and Vc becomes zero volts and the AD Control Signal (84) is not present while the embodiment is in HPM mode, the embodiment changes to LPM (90, 91, 93). If the battery (81) requires charging and Vc becomes zero volts and the AD Control Signal (84) is not present while the embodiment is in LPM the embodiment will remain in LPM until the battery is charged (90, 91, 93). If Vc is zero and the AD Control Signal (84) is not present when the battery (81) charging is complete the embodiment will change to off mode (90, 91, 92, 94).

9) If the embodiment is unplugged or disconnected from the main power source the embodiment will default to HPM when re-connected to the main power source (95, 97). If the battery (81) is not fully depleted the embodiment will immediately change to LPM (98, 90). If the AD (78) requires the embodiment to be in HPM when the embodiment is connected to the main power source the embodiment will remain in HPM (90, 96). This will occur given the presence of the AD Control Signal (84). If the AD Control Signal (84) is not present the embodiment will change to LPM briefly until AC (85) determines Vc is greater than or equal to 3V. When Vc is greater than or equal to 3V the AC (85) energizes NCR (87) (90, 96). When NCR (87) is de-energized the high power supply (76) is activated and the embodiment is in HPM mode.

10) The embodiment will operate in either LPM or HPM if the battery fails or becomes fully depleted depending on the power consumption of the AD (78) (90, 91, 93).

The power consumption of an AD (78) varies based on its modes of operations. If the AD (78) is a laptop with a rechargeable battery the power consumption of the AD (78) depends on a number of conditions. These conditions include the real time battery charge level (or percentage), laptop operational mode: on, off, standby or hibernate. Standby and hibernate modes are power consumption modes wherein the laptop reduces or turns-off components, such as display backlight, hard drive, etc. In battery charging mode, when the laptop battery is either partially or completely discharged, the laptop (AD (78)) consumes maximum power and the embodiment is in HPM. When the laptop battery is fully charged the laptop will consume less than the maximum power consumption. In that mode the embodiment may operate in LPM. As the AD (78) changes modes or battery charge level the embodiment changes modes among off, LPM or HPM as the real time power consumption of the laptop (AD (78)) changes and the AD Control Signal (84) is activated or not.

In this embodiment the normally closed relay maybe replaced with normally open relays based on the requirements of the intended use. Note, because of the direct connection between the LPM (74) and AD (78) the supply of low power may be on at all times.

Fifth Embodiment

A fifth embodiment of the invention is a power supply or battery charging system comprising two power supplies, low power and high power as depicted in FIG. 11. The low power supply (104) is designed to supply the minimum power requirement of the AD (103) or the on-off-standby mode control circuitry. The high power supply (105) is designed to supply the maximum power requirement of the AD (103). The high power supply (105) is turned on or off by a control signal, Vc (107), from AD (103). The AD (103) control circuitry may be supplied with power 100% of the time the AD (103) is connected to the Main Power AC Source. The Vc (107) activates the Solid State Relay (106) to activate the High Power Supply (105) when the AD (103) is in the On mode. The Solid State Relay (106) may include a flip-flop or latching mechanism for storing the Vc (107) signal such that the AD (103) would provide a Vc (107) signal for both activating the HPS (105) and deactivating the HPS (105).

The system can also be embodied as a power supply for a flat panel TV. This embodiment is utilized to reduce the power consumption of the TV when turned off. Flat panel TVs consume power when turned off, typically 0.4 to 3 W. This embodiment incorporates the same power supply utilized by the flat panel TV as the high power supply (105). The embodiment includes the low power supply (104) and the other components in the same configuration as either of the previous embodiments. In this embodiment the power supply power consumption in off mode is reduced up to 100% from the typical power consumption in off mode.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

The system has been described with respect to a laptop and a television. Other types of devices that can be operated by this system include other devices that include a low power mode of operation where energy can be saved when in the low power mode, such as a microwave oven, an audio/video receiver, a cable modem/receiver, a desktop computer, etc.

The invention claimed is:

1. An apparatus, comprising:
first means for powering an electronic device, wherein the first means for powering is associated with a high-power mode of operation of the apparatus;
means for monitoring when the electronic device requires power;
second means for powering the means for monitoring, wherein the second means for powering is associated with a low-power mode of operation of the apparatus; and means for turning off the first means for powering when the electronic device does not require the power.

2. The apparatus of claim 1, wherein the second means for powering comprises an AC to DC power supply.

3. The apparatus of claim 1, wherein the second means for powering comprises a rechargeable battery.

4. An apparatus, comprising:
first means for powering an electronic device, wherein the first means for powering is associated with a stand-by mode of operation;
means for monitoring when the electronic device requires power;
second means for powering the means for monitoring, wherein the second means for powering is associated with a power-off mode; and
means for turning off the first means for powering when the electronic device does not require the power.

5. The apparatus of claim 4, wherein the second means for powering comprises an AC to DC power supply.

6. The apparatus of claim 4, wherein the second means for powering comprises a rechargeable battery.

7. A memory device having instructions stored thereon that, in response to execution by a control device, cause the control device to perform operations comprising:
monitoring a power requirement of an electronic device, wherein power for said monitoring is provided by a first power supply;
identifying a change to the power requirement, wherein the power requirement is provided by a second power supply; and
turning off the second power supply in response to identifying the change to the power requirement.

8. The memory device of claim 7, wherein monitoring the power requirement comprises monitoring the power requirement during a high-power mode of operation, and wherein turning off the second power supply is associated with a power-off mode of operation.

9. The memory device of claim 7, wherein the first power supply comprises an AC to DC power supply, and wherein the second power supply comprises a rechargeable battery.

10. The memory device of claim 9, wherein monitoring the power requirement comprises monitoring the power requirement during a power-off mode of operation.

11. The memory device of claim 10, further comprising:
identifying a second change to the power requirement during the power-off mode of operation; and
turning on the AC to DC power supply in response to identifying the second change to the power requirement.

12. A method, comprising:
recharging a battery during a high-power mode of operation associated with an electronic device, wherein the battery is recharged by an AC to DC power supply configured to provide power to the electronic device;
determining when the battery is recharged;
receiving a control signal indicating that the power consumed by the electronic device is zero; and
in response to receiving the control signal, turning off the AC to DC power supply during a power-off mode of operation when the battery is recharged.

13. The method of claim 12, wherein the control signal is received from a monitoring circuit powered by the battery.

14. The method of claim 12, wherein the control signal is received in response to the electronic device being turned off or disconnected from the AC to DC power supply.

15. The method of claim 12, further comprising:
receiving a second control signal indicating that the electronic device has been turned on; and
turning on the AC to DC power supply in response to receiving the second control signal.

16. An apparatus, comprising:
an AC to DC power supply configured to provide power to an electronic device; and
a control device configured to:
monitor a state of charge of a battery during a high-power mode of operation associated with the electronic device;
receive a control signal indicating that the power consumed by the electronic device is zero; and
turn off the AC to DC power supply during a power-off mode of operation, in response to receiving the control signal, when the battery is fully charged.

17. The apparatus of claim 16, wherein the control signal is received from a monitoring circuit powered by the battery.

18. The apparatus of claim 17, wherein the control device is further configured to:
receive a second control signal indicating that the electronic device has been turned on; and
turn on the AC to DC power supply in response to receiving the second control signal.

19. The apparatus of claim 18, wherein the control signal is received during the high-power mode of operation, and wherein the second control signal is received during the power-off mode of operation.

20. The apparatus of claim 19, wherein the second control signal is received from the monitoring circuit.

21. The apparatus of claim 16, wherein the control signal is received in response to the electronic device being turned off or disconnected from the AC to DC power supply.

22. The apparatus of claim 16, wherein the control signal is received during the power-off mode of operation.

23. A method, comprising:
monitoring a power requirement of an electronic device, wherein power for said monitoring is provided by a first power supply;
identifying a change to the power requirement, wherein the power requirement is provided by a second power supply; and
turning off the second power supply in response to identifying the change to the power requirement.

24. The method of claim 23, wherein monitoring the power requirement comprises monitoring the power requirement during a high-power mode of operation, and wherein turning off the second power supply is associated with a power-off mode of operation.

25. The method of claim 23, wherein the first power supply comprises an AC to DC power supply, and wherein the second power supply comprises a rechargeable battery.

26. The method of claim 25, wherein monitoring the power requirement comprises monitoring the power requirement during a power-off mode of operation.

* * * * *

UNITED STATES PATENT AND TRADEMARK OFFICE
CERTIFICATE OF CORRECTION

| | | |
|---|---|---|
| PATENT NO. | : 8,575,785 B2 | Page 1 of 1 |
| APPLICATION NO. | : 13/527946 | |
| DATED | : November 5, 2013 | |
| INVENTOR(S) | : Perper et al. | |

It is certified that error appears in the above-identified patent and that said Letters Patent is hereby corrected as shown below:

On Title Page 2, in Item (56), under "OTHER PUBLICATIONS", in Column 2, Line 21, delete "detailes." and insert -- details. --, therefor.

In the Specification

In Column 3, Line 16, delete "(NPM)" and insert -- (HPM) --, therefor.

In Column 5, Line 8, delete "(10μ," and insert -- (10, --, therefor.

In Column 5, Line 33, delete "resistor (4)," and insert -- resistor (4). --, therefor.

In Column 9, Line 46, delete "(HPM)," and insert -- (HPM). --, therefor.

In Column 9, Line 56, delete "NCR, (35)." and insert -- NCR (35). --, therefor.

In Column 10, Line 31, delete "RPM" and insert -- HPM --, therefor.

In Column 11, Line 19, delete "AD (57)" and insert -- AD (55) --, therefor.

In Column 11, Line 49, delete "CMSC" and insert -- CSMC --, therefor.

In Column 14, Line 48, delete "CSM (50)" and insert -- CSM (59) --, therefor.

In Column 15, Line 54, delete "2604P-US-DCS," and insert -- 2604P-US-DC5, --, therefor.

Signed and Sealed this
Thirteenth Day of May, 2014

Michelle K. Lee
*Deputy Director of the United States Patent and Trademark Office*